United States Patent
Kajiki et al.

(10) Patent No.: US 9,316,730 B2
(45) Date of Patent: Apr. 19, 2016

(54) MONITORING DEVICE AND MONITORING METHOD

(71) Applicant: FUJITSU LIMITED, Kawasaki-shi, Kanagawa (JP)

(72) Inventors: Junko Kajiki, Kawasaki (JP); Mitsuru Ochi, Kawasaki (JP); Tomonori Ikeya, Sagamihara (JP); Kazuhiko Shite, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 255 days.

(21) Appl. No.: 13/905,040

(22) Filed: May 29, 2013

(65) Prior Publication Data

US 2013/0335261 A1 Dec. 19, 2013

(30) Foreign Application Priority Data

Jun. 14, 2012 (JP) .................................. 2012-134930

(51) Int. Cl.
*G01S 13/56* (2006.01)
*G01S 13/93* (2006.01)
(Continued)

(52) U.S. Cl.
CPC .................. *G01S 13/56* (2013.01); *G01S 13/62* (2013.01); *G01S 13/931* (2013.01)

(58) Field of Classification Search
CPC ......... G01S 13/02; G01S 13/50; G01S 13/52; G01S 13/56; G01S 13/58; G01S 13/62; G01S 13/88; G01S 13/93; G01S 13/931
USPC .................. 342/27, 28, 70–72, 104–115, 118, 342/128–133, 165, 173, 175, 192–197, 342/159–162, 176, 179
See application file for complete search history.

(56) References Cited

U.S. PATENT DOCUMENTS 4,829,306 A * 5/1989 Gjessing et al. ............... 342/159
5,150,426 A * 9/1992 Banh et al. ..................... 342/160
(Continued)

FOREIGN PATENT DOCUMENTS

JP  2000-172980   6/2000
JP  2001-4742     1/2001
(Continued)

OTHER PUBLICATIONS

Extended European Search Report dated Dec. 18, 2014 for corresponding European Patent Application No. 13169690.8, 7 pages.
(Continued)

Primary Examiner — Bernarr Gregory
(74) Attorney, Agent, or Firm — Fujitsu Patent Center

(57) ABSTRACT

A monitoring device includes a memory configured to store first and second background information related to positional information of a fixed object existing in a detection area of a radar device that receives a reflected wave from an object existing at an emission destination of an emitted radar wave and detects position and moving velocity information of the object as detection information of the object; and a processor configured to detect, upon receiving a first specified signal, a temporary fixed object existing in a detection area of the radar device by using the detection information and the first background information stored in the memory, and to detect, upon receiving a second specified signal, a movement object existing in the detection area of the radar device by using the detection information and the second background information stored in the memory.

7 Claims, 20 Drawing Sheets

(51) Int. Cl.
  *G01S 7/40* (2006.01)
  *G01S 13/62* (2006.01)
  *G01S 13/00* (2006.01)

(56) References Cited

U.S. PATENT DOCUMENTS

| | | | | |
|---|---|---|---|---|
| 5,627,545 | A * | 5/1997 | Van Genderen et al. | 342/162 |
| 5,644,508 | A * | 7/1997 | McNary et al. | 342/159 |
| 5,721,692 | A * | 2/1998 | Nagaya et al. | 342/179 |
| 7,667,636 | B2 * | 2/2010 | Kikuchi | 342/70 |
| 7,903,021 | B2 * | 3/2011 | Aso et al. | 342/70 |

FOREIGN PATENT DOCUMENTS

| | | |
|---|---|---|
| JP | 2002-99986 | 4/2002 |
| JP | 2004-191095 | 7/2004 |
| WO | 2011040816 A1 | 4/2011 |

OTHER PUBLICATIONS

JPOA—Office Action of Japanese Patent Application No. 2012-134930 dated Mar. 1, 2016, with English translation of he relevant part, p. 2 line 13 to p. 3 line 21 of the Office Action. **JP2002-099986 cited in the JPOA was previously submitted in the IDS tiled on May 29, 2013, and considered by the Examiner on May 8, 2015.

* cited by examiner

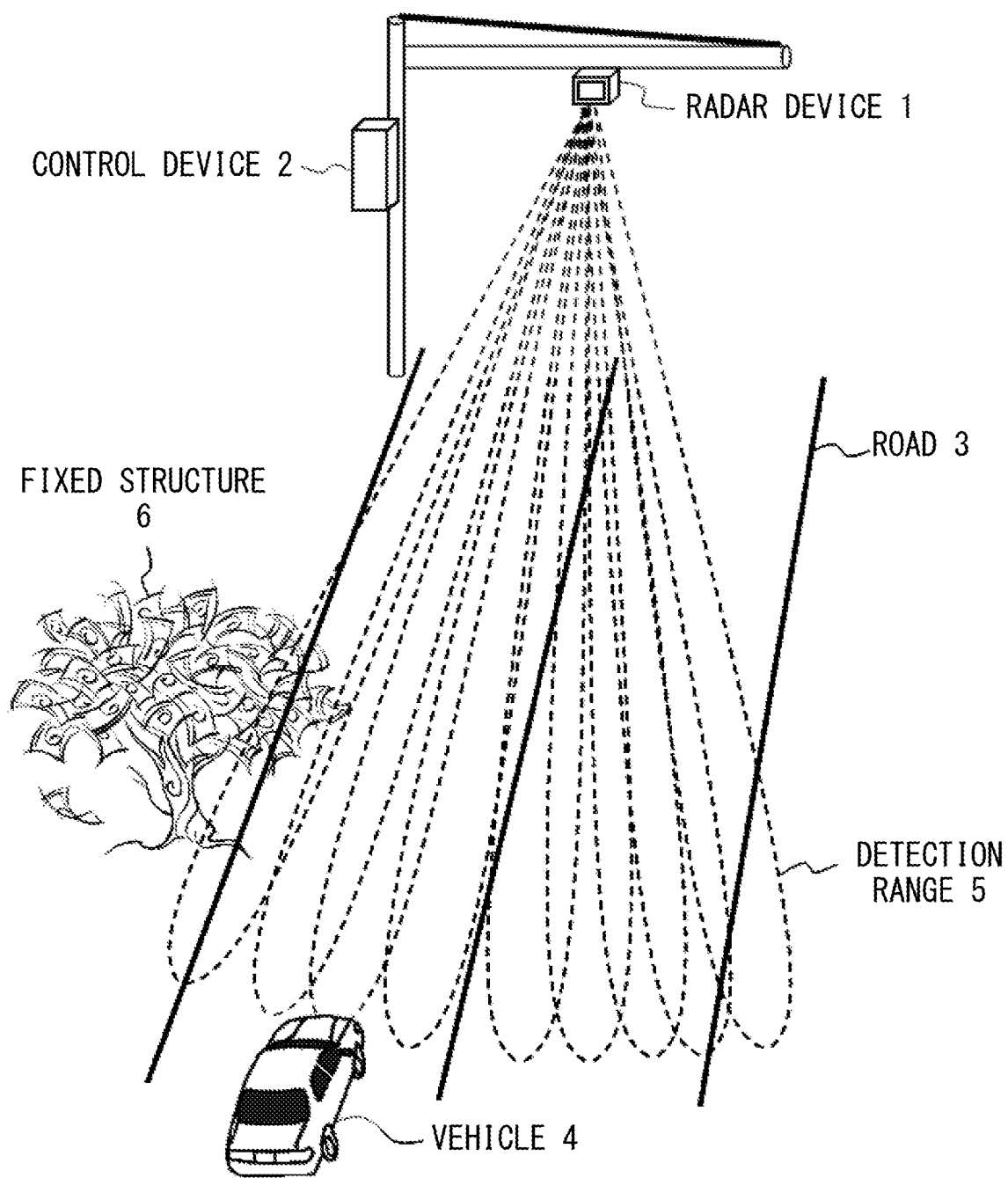
F I G. 2

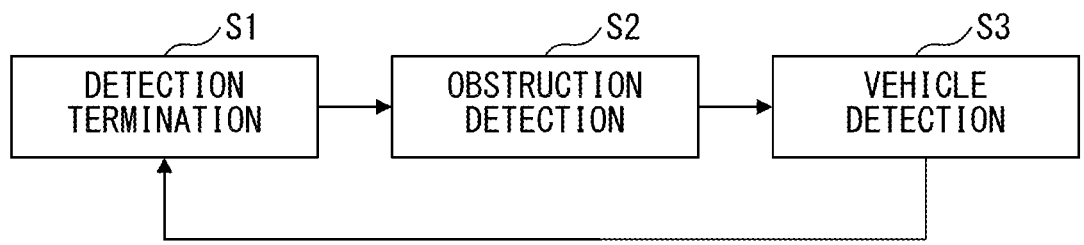
F I G. 5

| ANGLE | DISTANCE | TRAVELING VELOCITY |
|---|---|---|
| $\theta a$ | Da | Va |
| $\theta b$ | Db | Vb |

F I G. 8

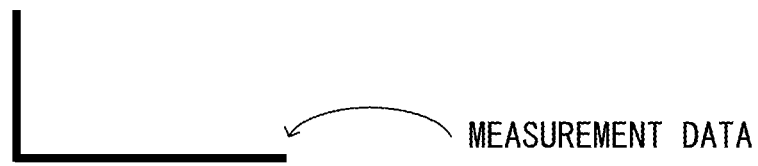
F I G. 1 1

RECORD INFORMATION TABLE 50

| NUMBER OF TIMES OF SCANNING \ LABEL NAME | 1 | 2 | 3 | 4 | | |
|---|---|---|---|---|---|---|
| t | L1 | L2 | L3 | | | |
| t-1 | OC | L2 | | | | |
| t-2 | L1 | L2 | | | | |
| ... | | | | | | |

RECOGNITION OF OBSTRUCTION (L1 at t and t-2; L2 column at t, t-1, t-2)

F I G. 1 2

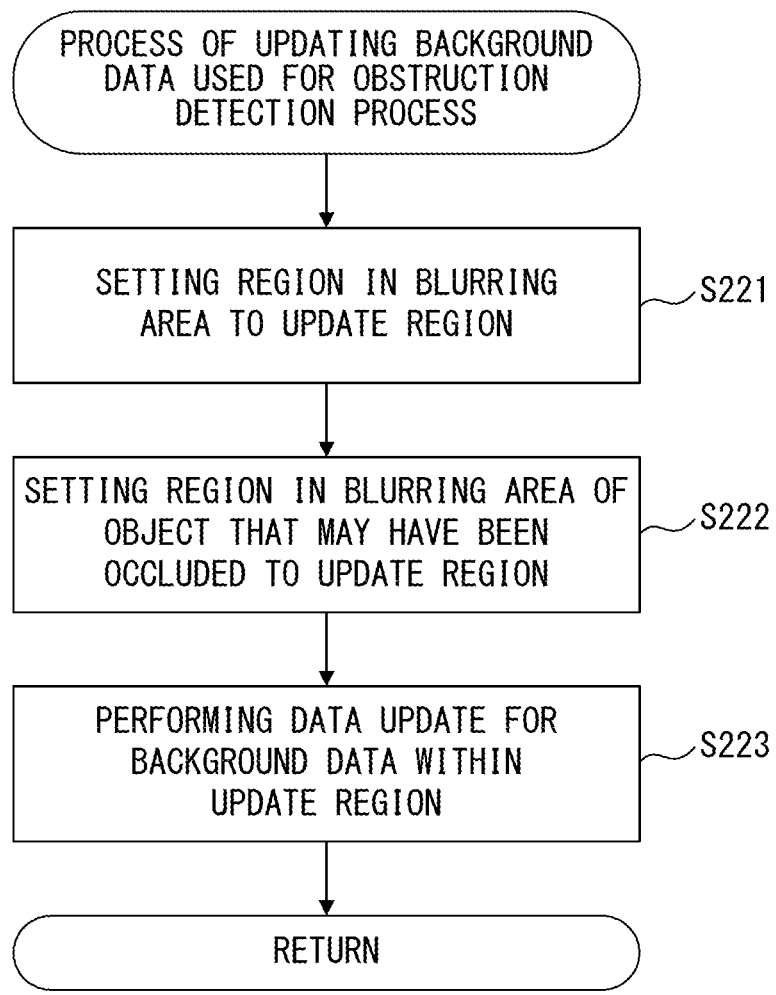
F I G. 1 3

| CURRENT POSITION | CURRENT VELOCITY | POSITION OF FIRST APPEARANCE | VELOCITY OF FIRST APPEARANCE | NUMBER OF TIMES OF ACTUAL MEASUREMENT | TOTAL VALUE OF VELOCITY | AVERAGE VELOCITY | NUMBER OF CONTINUOUS MEASUREMENT FAILURES |
|---|---|---|---|---|---|---|---|
| $Di_x, Di_y$ | Vi | $Dio_x, Dio_y$ | Vio | 10 | Vsi | Vai | 3 |
| $Dj_x, Dj_y$ | 0 | $Dj_x, Dj_y$ | 0 | 6 | 0 | 0 | 0 |

TRACE TABLE 61

| PREDICTION POSITION | PREDICTION VELOCITY | NUMBER OF TIMES OF TRACKING | STRUCTURE FLAG |
|---|---|---|---|
| $Din_x, Din_y$ | Vai | 12 | OFF |
| $Dj_x, Dj_y$ | 0 | 7 | ON |

F I G. 1 5

STRUCTURE TABLE 62

| ID | POSITION | TRACKING FLAG | NUMBER OF TIMES OF ACTUAL MEASUREMENT | NUMBER OF TIMES OF TRACKING |
|---|---|---|---|---|
| aa | $Daa_x, Daa_y$ | 10 | 12 | 0 |
| bb | $Dbb_x, Dbb_y$ | 6 | 7 | 2 |
| | | | | |

F I G. 1 6

MONITORING DEVICE AND MONITORING METHOD

CROSS-REFERENCE TO RELATED APPLICATIONS

This application is based upon and claims the benefit of priority from prior Japanese Patent Application No. 2012-134930, filed on Jun. 14, 2012, the entire contents of which are incorporated herein by reference.

FIELD

The embodiments discussed herein are related to a technique of detecting the existence of an object by using the reflection of radio waves.

BACKGROUND

A technique in which a vehicle stopped at the end of an out-of-sight road such as a curve or upslope is detected and the detection result is given to the following vehicles is useful for preventing rear-end collisions. As one such technique, a technique in which a moving vehicle is tracked and detected by using a millimeter-wave radar arranged at a road is known. In this technique, the position and velocity of a vehicle is firstly predicted according to the track data obtained in the first scanning. Then, a segmentation process and attribute generation process are performed for the obtained prediction data and the position and velocity data obtained in the second scanning, and the results are checked against each other (for example, see Patent Document 1).

The technique of tracking and detecting a moving vehicle will be further described.

In the technique of tracking and detecting a moving vehicle, a background subtraction process is firstly performed for the measurement data sent from the millimeter wave sensor. In the background subtraction process, the difference between the measurement data and the background data is calculated, and the measurement result related to a background object not to be tracked, such as a fixed structure like a utility pole or a guardrail, is deleted and the measurement data of a movement object is maintained. By performing the background subtraction process to exclude a background object from the later processes, it becomes possible to allow a longer processing time for the process of tracking and detecting a movement object, or it becomes possible to shorten the processing time.

In regard to the generation of background data, a technique is known in which background data is generated as the background data is updated by calculating a weighted average between the blurred data obtained by performing a blurring process for the measurement data and the previous background data (for example, see Patent Document 2). Moreover, a technique is known in which the updating of the background data is controlled according to a result of detecting the existence of a background object that is temporarily hidden by other objects (for example, see Patent Document 3).

In the technique of tracking and detecting a moving vehicle above, a segmentation process in which movement objects with almost the same velocity are grouped and an attribute generation process in which an attribute such as a barycenter position and a velocity of the group are calculated from the measurement data of the grouped movement objects are performed subsequent to the background subtraction process. Then, the measurement data that will be subsequently obtained for the group is predicted according to the acquired attribute, and the group is tracked by checking the prediction result against the actually acquired measurement data.

At present, the demands for road status monitoring have become more complicated in the field of road traffic management. For example, a shoulder of a road may be managed in such a manner that a shoulder lane is permitted for travel only when the traffic volume is increased on a road composed of a plurality of lanes including a shoulder lane. Alternatively, roads may be managed by adopting, for example, reversible lanes where the traveling on lanes close to the center is prohibited in a both-ways road including a plurality of lanes and then the arrangement of the centerline is changed such that traveling in the reverse direction on these lanes is allowed. Further, there are some cases in which traveling on a portion of the lanes on a road is prohibited due to traffic accidents or disabled cars. For such lanes whose use has been temporarily altered, it is desired that the monitoring be adaptable for usage on a moment-to-moment basis.

In the monitoring of lanes where vehicles are allowed to travel, the monitoring object is a vehicle as a movement object. However, vehicles may stop moving on a temporary basis due to, for example, traffic congestion or instructions given by a traffic signal, and such vehicles should be included in the monitoring object. In the monitoring of lanes where vehicles are temporarily prohibited from traveling, the monitoring object is an object existing in a lane such as a stopped vehicle, a fallen object from a vehicle, a fallen rock, and large trash, i.e., an obstruction other than a fixed structure such as a utility pole or guardrail.

If roads are monitored by using conventional road monitoring devices, it is necessary to install separate monitoring devices for such different kinds of monitoring objects as vehicles and obstructions so as to be suitable for each monitoring object.

[Patent Document 1] Japanese Laid-open Patent Publication No. 2002-099986

[Patent Document 2] Japanese Laid-open Patent Publication No. 2000-172980

[Patent Document 3] Japanese Laid-open Patent Publication No. 2001-004742

SUMMARY

A monitoring device as will be described herein is provided with a background information storage unit, a first detection unit, and a second detection unit. A background information storage unit stores the first and second background information related to the positional information of a fixed object existing in a detection area of a radar device. A radar device receives a reflected wave from an object existing at an emission destination of an emitted radar wave to detect position and moving velocity information of the object as detection information of the object. Once a first specified signal is received, a first detection unit detects a temporary fixed object existing in the detection area of the radar device by using the detection information detected by the radar device and the first background information stored in the background information storage unit. Once a second specified signal is received, a second detection unit detects a movement object existing in the detection area of the radar device by using the detection information detected by the radar device and the second background information stored in the background information storage unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is an explanatory schematic diagram of a rotational scanning type radar device.

FIG. 5 illustrates an example of the transition of the operations of a monitoring device arranged at a road for which the management of a road shoulder is performed.

FIG. 8 depicts an example of the data of the detection information output from a radar device.

FIG. 11 is an example of the measurement data obtained in a background subtraction process.

FIG. 12 is an example of a record information table.

FIG. 13 is a flowchart illustrating how a process of updating background data used for an obstruction detection process is performed.

FIG. 15 depicts the structure of a trace table.

FIG. 16 depicts the structure of a structure table.

DESCRIPTION OF EMBODIMENTS

Figure 1:
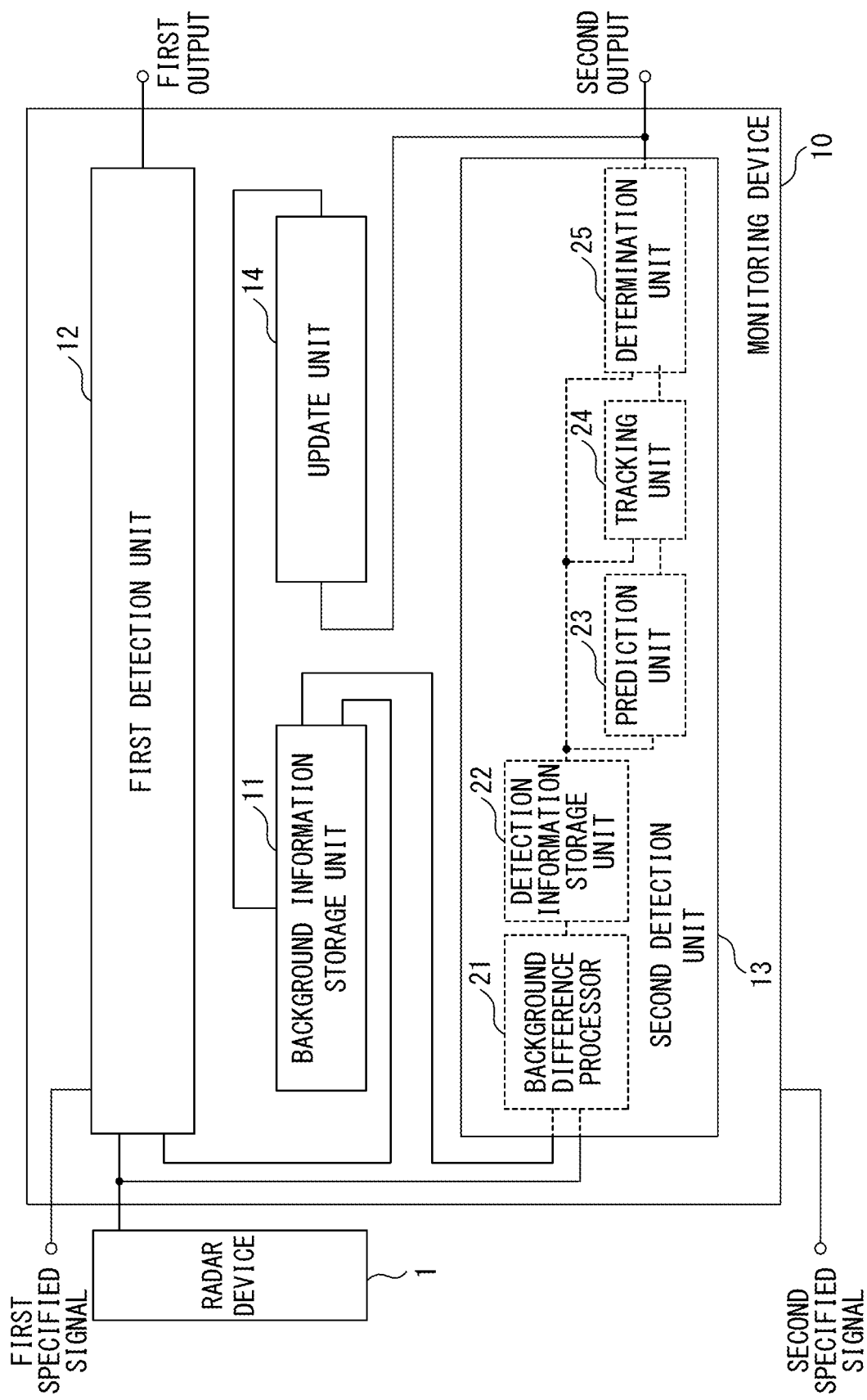
FIG. 1 is a functional block diagram illustrating the configuration of a monitoring device according to one embodiment.

Firstly, FIG. 1 will be described. FIG. 1 is a functional block diagram illustrating the configuration of a monitoring device according to one embodiment. The monitoring device has an advantageous effect of enabling appropriate monitoring according to a monitoring object.

In FIG. 1, a radar device 1 is connected to a monitoring device 10. The radar device 1 receives a reflected wave from an object existing at an emission destination of an emitted radar wave to detect position and moving velocity information of the object as detection information of the object.

The radar device 1 that is used in the present embodiment will be described with reference to FIG. 2.

In the present embodiment, a device of a rotational scanning type is used as the radar device 1. FIG. 1 schematically illustrates how a vehicle 4 traveling on a road 3 is detected by a detection system provided with the rotational scanning type radar device 1 and a control device 2 that electronically or mechanically controls the rotational scanning. The radar device 1 scans a detection range 5 to the right and left on a horizontal plane so as to detect the existing direction of the vehicle 4, an obstruction (not illustrated) on the road 3, and a tree that is a fixed structure 6 located at a shoulder of the road 3. In other words, the positions of the vehicle 4, an obstruction, and the fixed structure 6 may be two-dimensionally specified by using such a rotational scanning type radar device 1.

We will now return to the description of FIG. 1.

A monitoring device 10 is provided with a background information storage unit 11, a first detection unit 12, and a second detection unit 13.

The background information storage unit 11 stores the first and second background information related to the positional information of fixed objects existing in the detection area of the radar device 1.

Once a first specified signal is received, the first detection unit 12 detects a temporary fixed object existing in the detection area of the radar device 1 by using the detection information detected by the radar device 1 and the first background information stored in the background information storage unit 11. When the monitoring object of the monitoring device 10 is a road, a temporary fixed object indicates an obstruction such as a stopped vehicle, a fallen object from a vehicle, a fallen rock, or large trash, and excludes a fixed structure such as a utility pole or guardrail. The first specified signal is, for example, a signal that gives instructions to change the operation mode of the monitoring device 10 to a mode for detecting an obstruction.

Once a second specified signal is received, the second detection unit 13 detects a movement object existing in the detection area of the radar device 1 by using the detection information detected by the radar device 1 and the second background information stored in the background information storage unit 11. When the monitoring object of the monitoring device 10 is a road, a movement object indicates a moving vehicle, but may also include, for example, a temporarily stopped vehicle due to traffic signal instructions, traffic congestion, or the like. The second specified signal is, for example, a signal that gives instructions to change the operation mode of the monitoring device 10 to a mode for detecting vehicles.

While the first background information used for detecting a temporary fixed object is the information about an object that has remained at rest for a long time in the detection area of the radar device 1, the second background information used for detecting a movement object is the information about an object that recently stopped moving in the detection area. If such background information where the periods of remaining at rest are different for each targeted object is used for both the detection of temporary fixed objects and the detection of movement objects, a reduction in the detection accuracy is a concern. In particular, when the monitoring object of the monitoring device 10 has just been changed from movement objects to temporary fixed objects, it is necessary to acquire information about an object that has remained at rest for a long time as initial background information for temporary fixed object detection, and thus it takes a long time until the monitoring result is obtained. By contrast, both the first background information used for temporary fixed object detection and the second background information used for movement object detection are independently arranged for the monitoring device 10 of FIG. 1. Accordingly, a high detection accuracy is expected for both the temporary fixed object detection and the movement object detection. Moreover, as the first background information for the temporary fixed object detection is stored in the background information storage unit 11, it is possible to provide the monitoring result promptly even when the monitoring object of the monitoring device 10 has just been changed from movement objects to temporary fixed objects.

As illustrated in FIG. 1, the monitoring device 10 may further include an update unit 14. The update unit 14 updates the second background information stored in the background information storage unit 11 according to a detection result acquired by the second detection unit 13. The provision of the update unit 14 enables the second background information to be the latest information about an object that recently stopped moving in the detection area of the radar device 1.

Moreover, as illustrated in FIG. 1 by using broken lines, the second detection unit 13 of the monitoring device may include a background difference processor 21, a detection information storage unit 22, a prediction unit 23, a tracking unit 24, and a determination unit 25.

The background difference processor 21 extracts detection information about an object whose positional information does not match the second background information from the detection information detected by the radar device 1.

The detection information storage unit 22 stores for each object the detection information extracted by the background difference processor 21.

The prediction unit 23 predicts detection information that is newly detected by the radar device 1 and is then extracted by the background difference processor 21 for each object, according to the history of the detection information stored in the detection information storage unit 22.

The tracking unit 24 tracks an object by specifying an object from which detection information has been newly detected by the radar device 1, according to a result of the prediction of the detection information by the prediction unit 23.

The determination unit 25 determines whether or not the object being tracked by the tracking unit 24 is a movement object according to the history of the detection information about the object stored in the detection information storage unit 22.

When the second detection unit 13 is provided with the above elements, the update unit 14 may regard as the second background information the positional information of objects that are determined to not be movement objects by the determination unit 25 from among objects of which the detection information is detected by the radar device 1.

Accordingly, the second detection unit 13 is not only capable of detecting a movement object, but is also capable of detecting a temporarily stopped traveling object as a movement object.

When the moving velocity is less than a specified velocity threshold when the radar device 1 detects an object for the first time in the history of the detection information stored in the detection information storage unit 22, the determination unit 25 may determine that the object targeted in the history is not a movement object. It is preferred that the velocity threshold be a value close to '0'. In such cases, it becomes possible to determine that the object targeted in the history is a movement object as the object is assumed to have remained at rest since the object was initially detected by the radar device 1.

Figure 3:
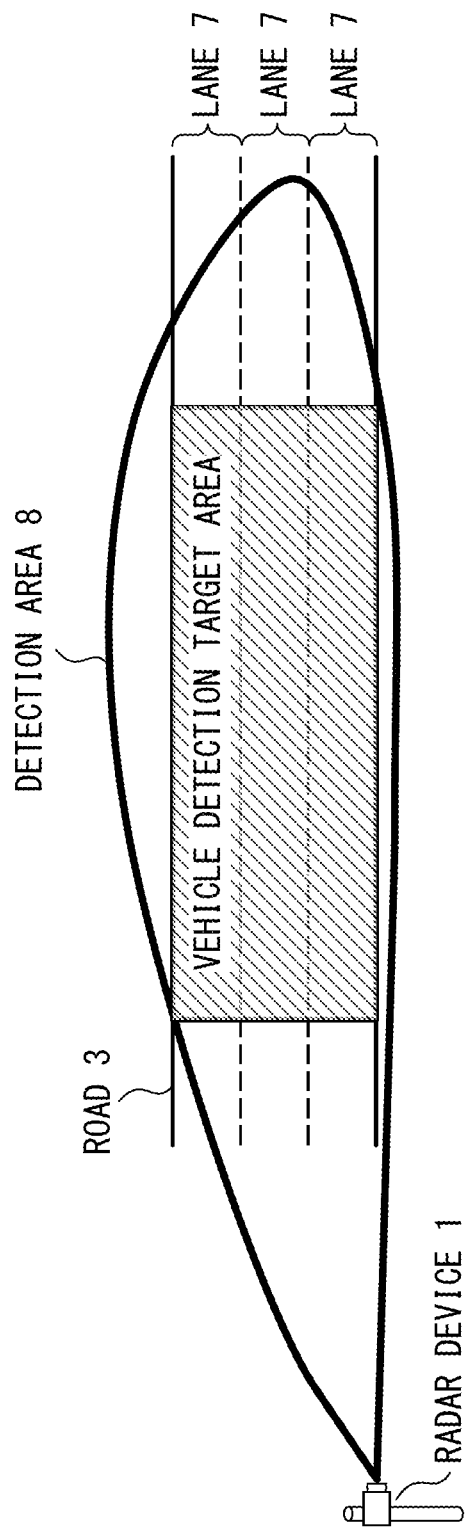
FIG. 3 is an explanatory schematic diagram of the case in which the detection area of a radar device includes a plurality of road lanes.

In FIG. 1, the detection area of the radar device 1 may include a plurality of road lanes. In the example of FIG. 3, the case in which the detection area 8 of the radar device 1 includes three lanes 7 of the road 3 is illustrated. The detection area 8 indicates the entire range in which the detection range 5 of the radar device 1 illustrated in FIG. 2 is scanned to the right and left on a horizontal plane.

When a plurality of road lanes are included in the detection area of the radar device 1 as above, it may be configured such that both the temporary fixed object detection by the first detection unit 12 and the movement object detection by the second detection unit 13 will be performed for an area of at least a portion of a lane among these plurality of lanes. In such cases as above, it may be configured such that both the first and second background information of the area of at least a portion of a lane will be stored in the background information storage unit 11.

Figure 4A:
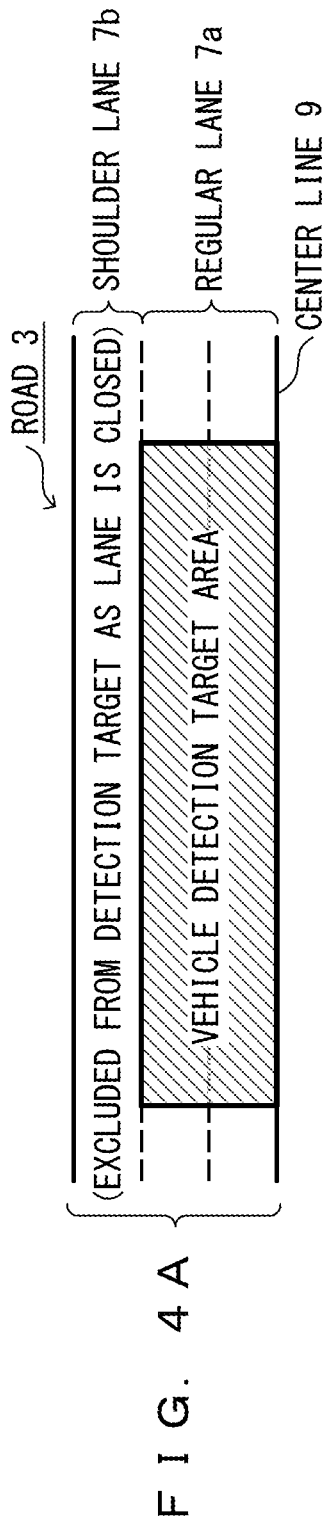
FIG. 4A is an explanatory schematic diagram of the management of a road shoulder.
Figure 4B:
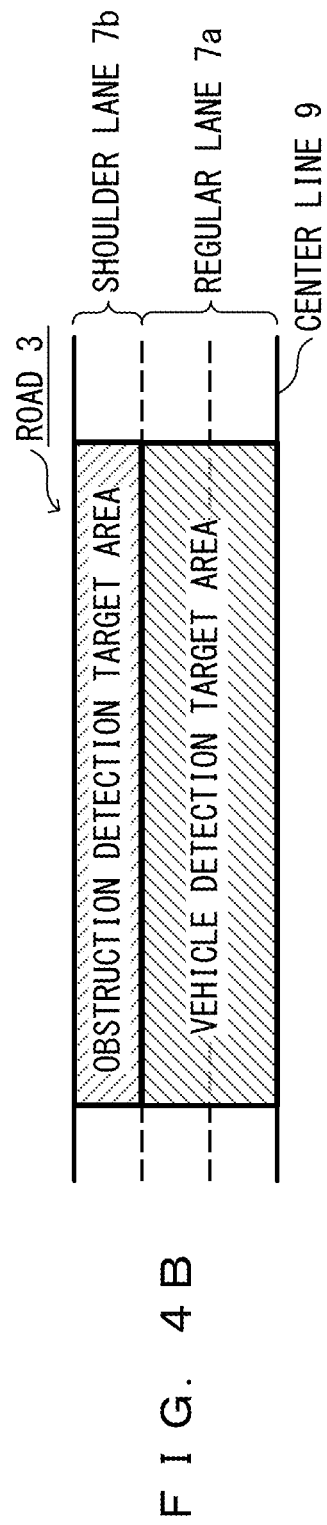
FIG. 4B is another explanatory schematic diagram of the management of a road shoulder.
Figure 4C:
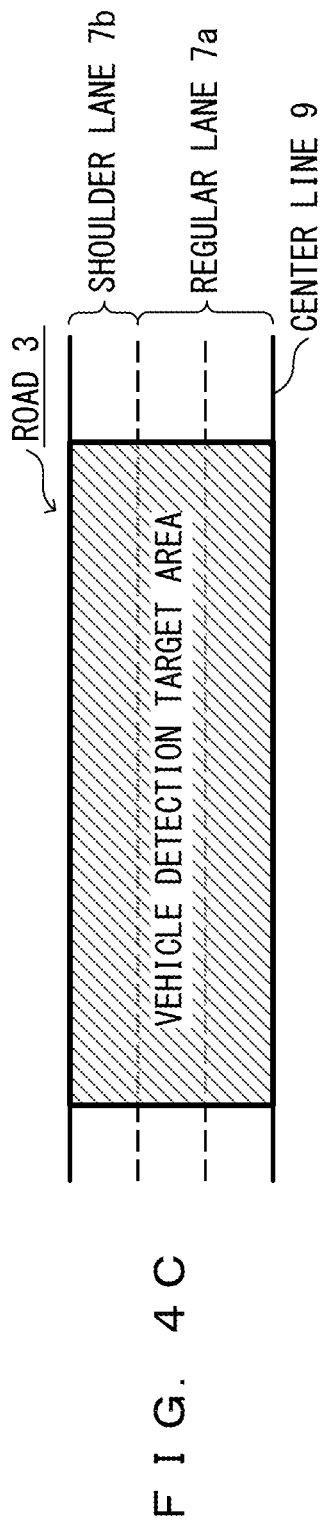
FIG. 4C is another additional explanatory schematic diagram of the management of a road shoulder.

An example in which the monitoring device 10 is configured as above will be described with reference to FIGS. 4A-4C. FIGS. 4A-4C illustrate a road for which the management of a road shoulder is performed.

Among FIGS. 4A-4C, FIG. 4A illustrates a normal operation in which travel is allowed in two regular lanes 7a on a center line 9 side of the road 3 and travel is prohibited in a shoulder lane 7b. In this case, the monitoring device 10 detects movement objects in the regular lanes 7a so as to measure the traffic volume of vehicles on the road 3.

Among FIGS. 4A-4C, FIG. 4B indicates a situation in which travel will soon be permitted in the shoulder lane 7b due to the increased traffic volume on the road 3. In this case, the monitoring device 10 detects a temporary fixed object in the regular lanes 7a so as to confirm that no obstruction exists in the shoulder lane 7b to which permission to travel will soon be given, while detecting movement objects in the regular lanes 7a in a similar manner to the case of FIG. 4A.

Among FIGS. 4A-4C, FIG. 4C indicates a situation in which travel has been permitted in the shoulder lane 7b. In this case, the monitoring device 10 also detects movement objects in the shoulder lane 7b so as to measure the traffic volume of vehicles on the road 3 while detecting movement objects in the regular lanes 7a in a similar manner to the case of FIG. 4A.

As described above, the monitoring device 10 detects movement objects in the regular lanes 7a on a regular basis.

On the other hand, the operation of the monitoring device 10 for the shoulder lane 7b is, as illustrated in FIG. 5 for example, cyclically switched among S1: detection termination, S2: operation of detecting an obstruction, and S3: operation of detecting vehicles. For this reason, in regard to the shoulder lane 7b for which both temporary fixed object detection and movement object detection are performed, it is configured such that both the first and second background information will be stored in the background information storage unit 11. Accordingly, when the operation for the shoulder lane 7b is switched between the temporary fixed object detection and the movement object detection, it becomes possible for the monitoring device 10 to provide the monitoring result in an expeditious manner.

In the following description of the present embodiment, cases will be described in which the monitoring device 10 monitors the road 3 by performing the management of a road shoulder as illustrated in FIGS. 4A-4C.

Figure 6:
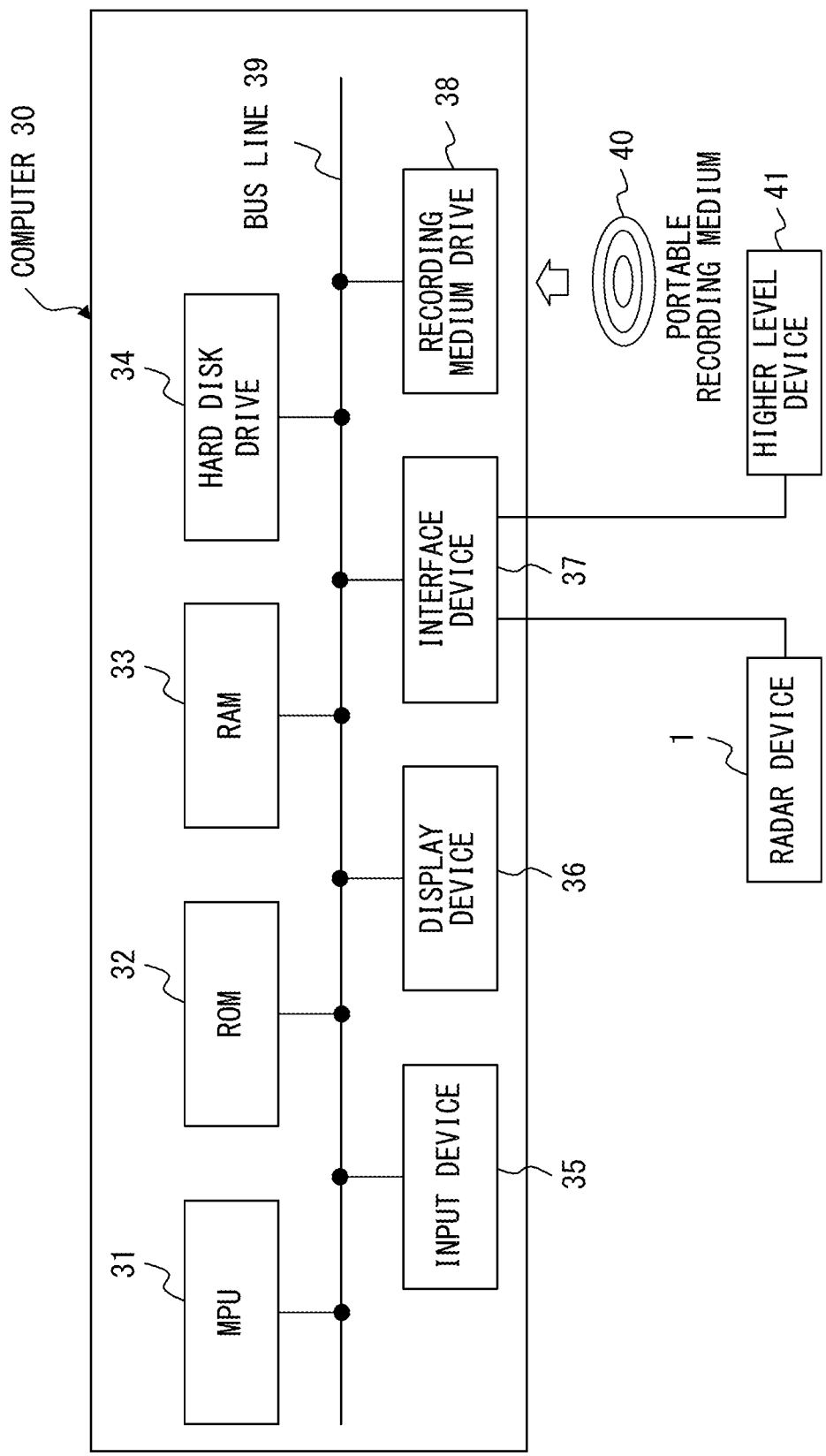
FIG. 6 illustrates an example of the hardware configuration of a monitoring device.

FIG. 6 will be explained next. FIG. 6 illustrates an example of the hardware configuration of the monitoring device 10 of FIG. 1.

In the present example of the configuration, the monitoring device 10 is configured by a computer 30. In FIG. 5, the radar device 1 and a higher level device 41 are connected to the computer 30. The higher level device 41 instructs the computer 30 to change the operation mode of the monitoring process, and acquires and manages the results of the monitoring of movement objects and temporary fixed objects output from the computer 30.

The computer 30 is provided with an MPU 31, a ROM 32, a RAM 33, a hard disk drive 34, an input device 35, a display device 36, an interface device 37, and a recording medium drive 38. These elements are connected to each other via a bus line 39, and various kinds of data may be exchanged among these elements under the control of the MPU 31.

The MPU (Micro Processing Unit) 31 is a processor that controls the entire operation of the computer 30.

The ROM (Read Only Memory) 32 is a read-only semiconductor memory in which a specified basic control program is recorded in advance. The MPU 31 reads and executes the basic control program at the startup of the computer 30, thereby enabling the control of the operation of each element of the computer 30. Note that a memory whose stored data is nonvolatile when the power supply is terminated, such as a flash memory, may be used as the ROM 32.

The RAM (Random Access Memory) 33 is an anytime-writable/readable semiconductor memory that is used as working storage as necessary when the MPU 31 executes various kinds of control programs. When the monitoring device 10 is configured by using the computer 30, the RAM 33 may serve as the background information storage unit 11 and the detection information storage unit 22 of FIG. 1.

The hard disk drive 34 is a storage device in which various kinds of control programs to be executed by the MPU 31 or various kinds of data are stored. It becomes possible for the MPU 31 to perform various kinds of control processes by reading and executing a specified control program stored in the hard disk drive 34.

The input device 35 is, for example, a keyboard or a mouse. When the input device 35 is operated, for example, by an administrator of the monitoring device 10, various kinds of information associated with the input operation by the administrator is acquired, and the acquired input information is transferred to the MPU 31.

The display device 36 is, for example, a liquid crystal display, and displays various kinds of texts or images according to the display data sent from the MPU 31.

The interface device 37 manages the data transfer of various kinds of information with various kinds of equipment that are connected to the computer 30. The radar device 1 and the higher level device 41 are connected to the interface device 37. Accordingly, the detection information output from the radar device 1 is taken into the computer 30 through the interface device 37. Moreover, an instruction signal to change the operation mode of the monitoring process, which is sent from the higher level device 41, is taken into the computer 30 through the interface device 37. A signal indicating the results of the monitoring of movement objects and temporary fixed objects output from the computer 30 is sent to the higher level device 41 through the interface device 37.

The recording medium drive 38 reads the various kinds of control programs or data stored in a portable recording medium 40. The MPU 31 may be configured to perform various kinds of control processes, as will be described later by reading and executing a specified control program recorded in the portable recording medium 40 through the recording medium drive 38. The portable recording medium 40 may be, for example, a CD-ROM (Compact Disc Read Only Memory) or a DVD-ROM (Digital Versatile Disc Read Only Memory), or a flash memory provided with a USB (Universal Serial Bus) connector.

When the monitoring device 10 is configured by using the computer 30 as above, for example, a control program is created that instructs the MPU 31 to perform monitoring processes, as will be described later. The created control program is stored in the hard disk drive 34 or the portable recording medium 40 in advance. Then, a specified instruction is given to the MPU 31 such that the control program will be read and executed. Accordingly, the computer 30 is enabled to serve as the background information storage unit 11, the first detection unit 12, the second detection unit 13, the update unit 14, or the like, and it becomes possible to configure the monitoring device 10 by using the computer 30.

Figure 7:
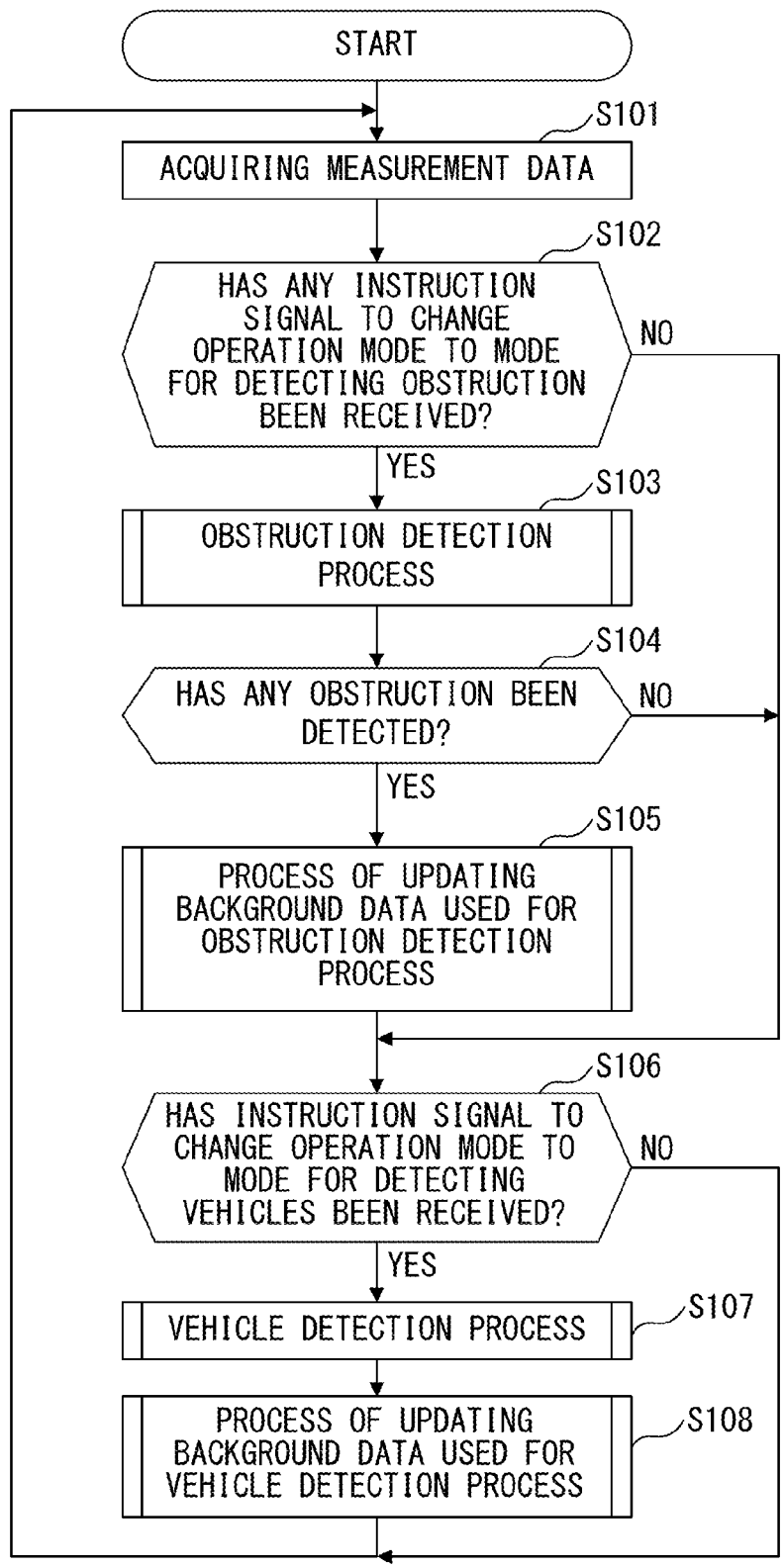
FIG. 7 is a flowchart illustrating how monitoring processes are performed.

Next, monitoring processes that are performed by the computer 30 will be described. FIG. 7 is a flowchart illustrating how these monitoring processes are performed. The monitoring processes of FIG. 7 are performed for the shoulder lane 7b on the road 3 of FIG. 4.

When the processes of FIG. 7 start, in S101, the MPU 31 firstly performs the process of acquiring measurement data.

Here, the measurement data will be described with reference to FIG. 8.

FIG. 8 depicts an example of the data of the detection information output from the radar device 1. The detection information indicates the data in which pieces of data are associated with each other, including the scanning angle, the distance between the radar device 1 and the reflection point of the radar wave, and the moving velocity of the object, where these pieces of data are obtained every time a radar wave reflected off an object is received by the radar device 1 that performs rotational scanning. Here, a group of data in which pieces of data including the angle, distance, and moving velocity are associated is referred to as 'measurement data'.

We will now return to the description of the processes of FIG. 7. Next, in S102, the MPU 31 determines whether or not the interface device 37 has received from the higher level device 41a specified instruction signal to change the operation mode for monitoring the shoulder lane 7b on the road to the mode for detecting an obstruction. When the determination result is "Yes", i.e., when it is determined that the specified signal has been received, the MPU 31 shifts the process to S103. On the other hand, when the determination result is "No", i.e., when it is determined that the specified signal has not been received, the MPU 31 shifts the process to S106.

In S103, the MPU 31 performs an obstruction detection process. The process of S103 relates to the detection of the aforementioned temporary fixed object, i.e., the obstruction, existing in the detection area of the radar device 1, and the obstruction detection process will be described later in detail. The functions of the first detection unit 12 in FIG. 1 are provided by the MPU 31 that performs the process of S103 subsequent to the determination process of S102 described above.

Next, in S104, the MPU 31 determines whether or not an obstruction has been detected in the obstruction detection process of S103. When the determination result is "Yes", i.e., when it is determined that no obstruction has been detected, the MPU 31 shifts the process to S105. On the other hand, when the determination result is "No", i.e., when it is determined that an obstruction has been detected, the MPU 31 shifts the process to S106.

Next, in S105, the MPU 31 updates the first background information, which is the background data used for the obstruction detection process of S103 from among the background data of the shoulder lane 7b stored in the RAM 33, according to the results of the previously performed obstruction detection process. The update process will be described later in detail.

Next, in S106, the MPU 31 determines whether or not the interface device 37 has received from the higher level device 41a specified instruction signal to change the operation mode for monitoring the shoulder lane 7b on the road 3 to the mode for detecting vehicles. When the determination result is "Yes", i.e., when it is determined that the specified signal has been received, the MPU 31 shifts the process to S107. On the other hand, when the determination result is "No", i.e., when it is determined that the specified signal has not been received, the MPU 31 shifts the process to S108.

Next, in S107, the MPU 31 performs a vehicle detection process. The process of S107 relates to the detection of the aforementioned movement object, i.e., traveling or temporarily stopped vehicle, existing in the detection area of the radar device 1, and the vehicle detection process will be described later in detail. The functions of the second detection unit 13 in FIG. 1 are provided by the MPU 31 that performs the process of S107 subsequent to the determination process of S106 described above.

Next, in S108, the MPU 31 updates the second background information, which is the background data used for the vehicle detection process of S107 from among the background data of the shoulder lane 7b stored in the RAM 33, according to the results of the previously performed vehicle detection process. The update process will be described later in detail. The functions of the update unit 14 in FIG. 1 are provided by the MPU 31 that performs the process of S108. Subsequently, the MPU 31 returns the process to S101 after the update process of S108 is completed, and repeats the processes described above. Note that it is configured such that the process of acquiring measurement data in S101 will be performed at specified intervals in the repetition of the processes.

The monitoring process of FIG. 7 is achieved by the processes described above.

Figure 9:
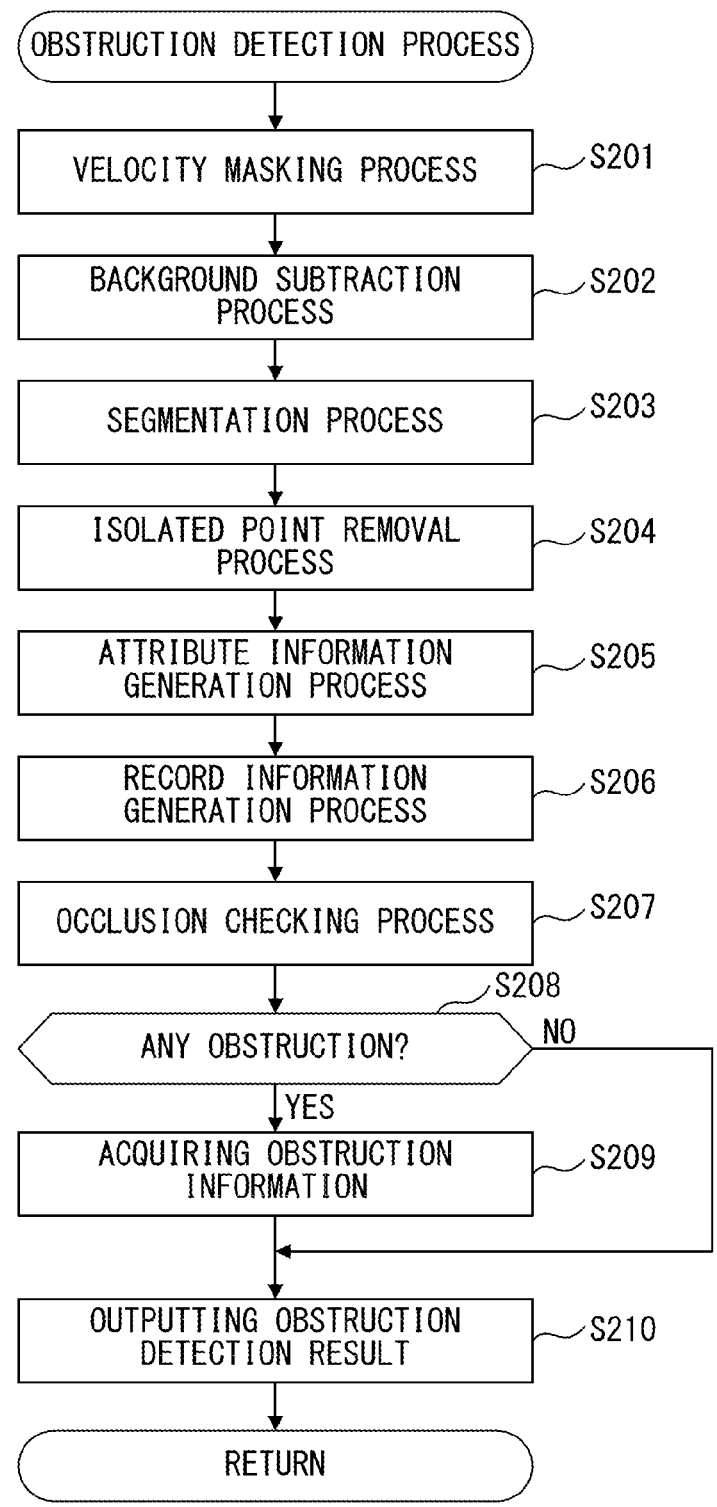
FIG. 9 is a flowchart illustrating how an obstruction detection process is performed.

Next, the obstruction detection process of S103 in the monitoring process of FIG. 7 will be described with reference to FIG. 9. FIG. 9 is a flowchart illustrating how the obstruction detection process is performed.

The obstruction detection process of FIG. 9 is a process for enabling the MPU 31 to perform the obstruction detection method described in the above-mentioned Patent Document 3.

When the processes of FIG. 9 start, firstly, in S201, the MPU 31 performs a velocity masking process. The process of S201 indicates a process of excluding the measurement data in which a moving velocity that is faster than a specified velocity is indicated from the measurement data acquired in the process in S101 of FIG. 8. In the process of S201, the measurement data related to moving vehicles is excluded from the measurement data acquired in the process of S101, and the measurement data related to an obstruction and the measurement data related to a fixed structure described above are acquired. The measurement data may include the data related to temporarily stopped vehicles or vehicles that are traveling at an extremely low velocity, but such vehicles are considered to be obstructions.

Next, in S202, a background subtraction process is performed. In the background subtraction process, a difference between the measurement data and the first background information stored in the RAM 33 that serves as the background information storage unit 11 is calculated, and the measurement data related to the fixed structure described above is deleted.

The background subtraction process will be described with reference to FIG. 10A, FIG. 10B, and FIG. 11.

Figure 10A:
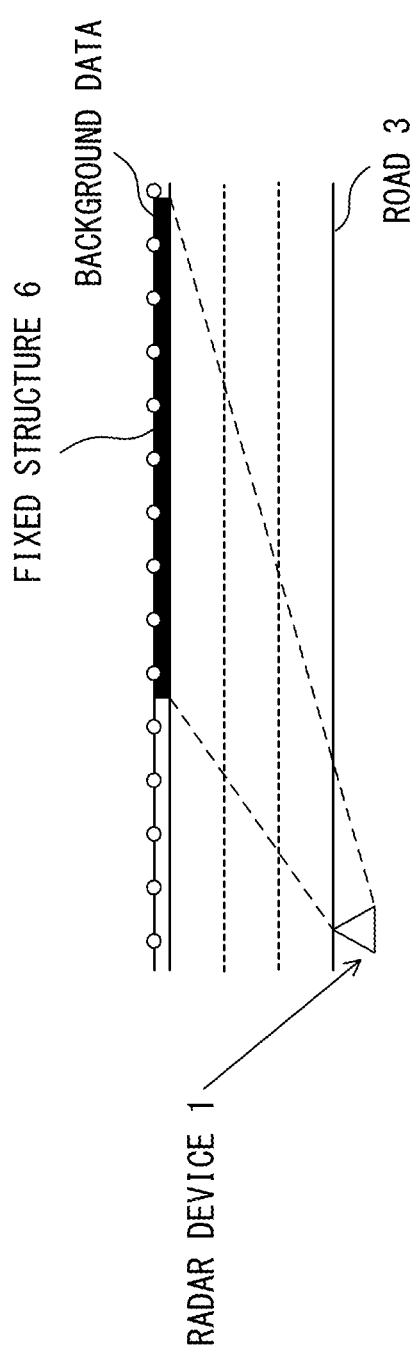
FIG. 10A is an explanatory schematic diagram of a background subtraction process.
Figure 10B:
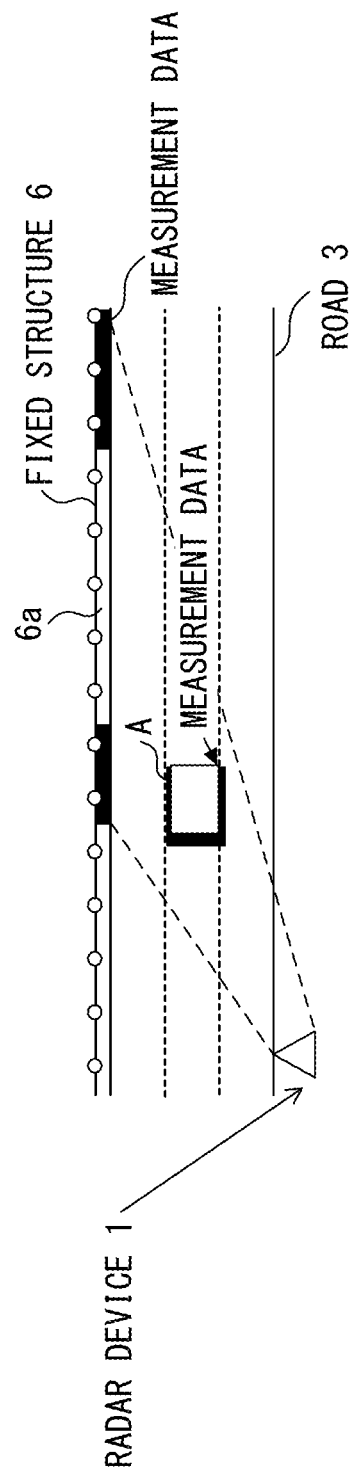
FIG. 10B is another explanatory schematic diagram of the background subtraction process.

FIG. 10A indicates the status of the road 3 in which neither a vehicle nor an obstruction exists, and FIG. 10B indicates the status of the road 3 in which an obstruction A exists. Note that a guardrail is arranged on the road 3 as the fixed structure 6.

If the radar device 1 is operated under such conditions as to perform rotational scanning on the range enclosed by broken lines in FIG. 10A, the measurement data related to the object indicated by a bold line in FIG. 10A is acquired. The acquired measurement data is an aggregate of dot data of the area ranging from the intersection point of a broken line on the left and the guardrail to the intersection point of a broken line on the right and the guardrail, where these intersection points are represented by angles and distances as viewed from the radar device 1. Such measurement data that is acquired when neither a vehicle nor an obstruction exists on the road 3 and that is only related to the fixed structure 6 is the first background information for the obstruction detection process. The first background information is stored in the RAM 33 that serves as background information storage.

In the following description, the angle viewed from the radar device 1 will be referred to simply as 'angle' unless specified in particular.

On the other hand, if the radar device 1 is operated to perform rotational scanning on the range enclosed by broken lines in FIG. 10B under the conditions of the road 3 illustrated in FIG. 10B, the measurement data related to the object indicated by a bold line in FIG. 10B is acquired. The acquired measurement data is an aggregate of dot data of the obstruction A and a portion of the guardrail as the fixed structure 6.

In the background subtraction process of S202 in FIG. 9, the difference between the background data illustrated in FIG. 10A and the measurement data illustrated in FIG. 10B is calculated.

The measurement data of FIG. 10B is composed of the aggregate of dot data in the area expressed with bold lines, i.e., the aggregate of dot data of the L-shaped obstruction A and the aggregate of dot data of the guardrail in the range directly viewable from the radar device 1. Accordingly, the measurement data that remains after the subtraction process is performed is the data of the obstruction A and a center portion 6a of the guardrail. In the above measurement data, the center portion 6a of the guardrail is further removed from the measurement data because the center portion 6a of the guardrail exists in the background data. As a result, only the measurement data of the obstruction A related to the aggregate of dot data corresponding to the L-shaped portion illustrated in FIG. 11 is left.

We will now return to the description of the processes of FIG. 9.

Next, in S203, the MPU 31 performs a segmentation process on the measurement data that is left after the background subtraction process. In the segmentation process, the measurement data is classified into a plurality of groups by combining neighboring dot data in the measurement data into a single group. The measurement data of each aggregate of dot data that belongs to the same group as a result of the segmentation process is considered to be the measurement data of the same obstruction candidate.

Next, in S204, the MPU 31 performs an isolated point removal process. In the isolated point removal process, the isolated dot data that is not classified into any group as a result of the process of S203 is regarded as noise in the measurement performed by the radar device 1, and is removed.

Next, in S205, the MPU 31 performs an attribute information generation process. In the attribute information generation process, attribute information is generated for the measurement data of each obstruction candidate; the attribute information belongs to each group generated in the segmentation process of S203. In particular, the attribute information indicates the barycenter position, angle, distance, velocity of each detection point, and the size of the obstruction candidate, all of which are calculated from the angle and distance data, i.e., the measurement data of the detection points of the obstruction candidates measured by the radar device 1.

The attribute information is associated with information for identifying the obstruction candidates, such as label names, and is stored in the RAM 33. Note that the attribute information is not limited to barycenter information, but may be any information that specifies the positions of the obstruction candidates. For example, the attribute information may be the central coordinates of the circumscribed circle of obstruction, or the coordinates of a plurality of points on the circumference of an obstruction.

Next, in S206, the MPU 31 performs a record information generation process. In the record information generation process, the record information of each obstruction candidate is generated and recorded. In particular, in the record information generation process, firstly, the attribute information of the obstruction candidates generated in the above process is compared with the attribute information of obstruction acquired in the previously performed obstruction detection process. When there are obstructions that have matching attribute information, the MPU 31 stores the identification information of these obstructions, i.e., the label name, in a record information table as the record information of the present measurement. On the other hand, when there is no pair of obstructions that have matching attribute information, the MPU 31 stores the identification information of the obstruction candidate, i.e., the label name, in a record information table.

Here, FIG. 12 will be explained. FIG. 12 is an example of the record information table.

A record information table 50 is a table in which the detection records of obstructions are recorded, and where label names for discriminating obstructions are recorded in sequence according to the scanning timing in the rotational scanning of the radar device 1. The record information table 50 is stored in the RAM 33.

It is recorded in the example of FIG. 12 that two obstruction candidates are detected and their label names are "L1" and "L2" at the "t−2"th scanning. It is also indicated that an obstruction candidate corresponding to the label name "L2" was detected but an obstruction candidate corresponding to the label name "L1" was not detected at the following "t−1"th scanning. Note that there is a possibility that the obstruction candidate corresponding to the label name "L1" has been occluded by another object, i.e., there is a possibility that the obstruction candidate corresponding to the label name "L1" has been temporarily hidden from the detection range of the radar device 1 by another object, for example, a vehicle traveling in another lane. In such a case, a reference sign "OC" that indicates the above possibility is stored in the field of label name "1" in regard to the obstruction candidate. An occlusion checking process is performed in the process of S207 of FIG. 9, as will be described later. In the following "t"th scanning process, obstruction candidates for the label names "L1" and "L2" are detected, and a new obstruction candidate is also detected. Thus, a label name "L3" for identifying the new obstruction candidate is recorded.

We will now return to the description of the processes of FIG. 9.

Next, in S207, the MPU 31 performs an occlusion checking process. In the occlusion checking process, the record information table 50 and the attribute information described above are referred to, and whether or not there is any occlusion, i.e., whether or not there exists any obstruction that has been temporarily hidden by another object, is checked. In particular, in the occlusion checking process, when the obstruction that was detected in the previously performed obstruction detection process is not detected in the present obstruction detection process, it is assumed that the obstruction is temporarily hidden by another object, and a record is made on the record information table 50 as described above. The result of the occlusion checking process is used in the process of updating background data used for the obstruction detection process, as will be described later.

Next, in S208, the MPU 31 determines whether there are any obstructions. The determination process is achieved by referring to the record information table 50 to determine whether or not an obstruction candidate having the same label name, i.e., the same attribute information, has been repeatedly detected a specified number of times or more. When the same obstruction candidate is detected a specified number of times or more, for example, twice, it is determined that an obstruction has been detected.

When the determination result is "Yes" in the determination process of S208, i.e., when it is determined that an obstruction has been detected, the MPU 31 shifts the process to S209. On the other hand, when the determination result is "No", i.e., when it is determined that an obstruction has not been detected, the MPU 31 shifts the process to S210.

Next, in S209, the MPU 31 acquires information about the obstruction that was determined to have been detected in S208. In particular, in the acquisition process, firstly, the barycenter position of the aggregate of dot data of the detected obstruction described above is calculated. Then, the distance from the radar device 1 to the barycenter and the angle are calculated according to the measurement data, and the size information of the detected obstruction is further acquired according to the position at which the aggregate of dot data is arranged.

Next, in S210, the MPU 31 outputs an obstruction detection result to the higher level device 41 through the interface device 37. Then, the MPU 31 terminates the obstruction detection process, and returns the process to the monitoring process of FIG. 7. In the process of S210, information about the obstruction acquired in the process of S209 is output when an obstruction is detected, and information indicating that no obstruction has been detected is output when no obstruction has been detected.

The obstruction detection process is achieved by the processes described above.

Instead of the above processes performed by the MPU as the obstruction detection process, the obstruction detection method may for example be performed as disclosed in the above-mentioned Patent Document 2.

Next, the process of updating background data used for the obstruction detection process, which is the process of S105 in the monitoring process of FIG. 7, will be described.

In the update process, firstly, the range in which a data update is to be performed is determined within the detection area of the radar device 1, and first background information within the update range is updated.

In the process of S105, the measurement data that is acquired in the process of S101 is used. Note that the process of S105 is performed only when "No" is obtained as a result of the determination process of S104, i.e., when no obstruction has been determined to have been detected in the obstruction detection process of S103. For this reason, the measurement data that is used in the process of S105 includes the data related to the fixed structure 6, but does not include the measurement data related to an obstruction, i.e., to a temporary fixed object.

FIG. 13 will be described. FIG. 13 is a flowchart illustrating how the process of updating background data used for the obstruction detection process is performed.

Basically, the update process of FIG. 13 is similar to the background data update process disclosed in the above-mentioned Patent Document 3.

When the processes of FIG. 13 start, in S221, the MPU 31 firstly sets a region in a blurring area of the object, which is indicated by the measurement data that was acquired in the most recently performed process of S101, as an update region in the background data. Here, the blurring area refers to an area surrounding the object at a specified distance from the object, and the background data of a region in the blurring area is to be updated.

Next, in S222, the row of the most recently performed scanning in the aforementioned record information table 50 is referred to, and the MPU 31 sets as an update region in the background data a region in the blurring area of the object that is an obstruction candidate to which the reference sign "OC" is assigned. As such an object is hidden by an object due to occlusion, there is a possibility that the object is a fixed structure 6 not included in the measurement data that was acquired in the most recently performed process of S101. Moreover, as described above, the process of updating background data used for the obstruction detection process is performed only when it is determined that no obstruction has been detected in the obstruction detection process of S103, and thus the process is not very frequently performed. Hence, the background data is updated for such a region of an object.

Next, in S223, the MPU 31 performs a data update for the background data within the update region set in the above process, and then terminates the process of FIG. 13.

In the present embodiment, the MPU 31 calculates the background data by performing the calculation of the equation below for each position in the update region.

$$M=(1-\alpha)M_0+\alpha Db \quad (1)$$

In the above equation, "M" indicates the updated background data, and "$M_0$" indicates the background data before updating. "D" is the measurement data obtained in the process of S101, where the value is '1' when the measurement data of the position exists and the value is '0' when the measurement data of the position does not exist. The MPU 31 updates the background data by reading the background data before updating from a specified region of the RAM 33 that serves as the background information storage unit 11, performing the calculation in the above Equation (1), and writing the calculated updated background data in the specified region of the RAM 33.

In the background subtraction process described above, the first background information as updated above is binarized to obtain data that indicates whether or not a fixed structure exists at each position in the detection area of the radar device 1, and the difference between the obtained data and the measurement data is calculated. Accordingly, the measurement data related to the fixed structure is deleted.

The process of updating background data used for the obstruction detection process is achieved by the processes described above.

It may be configured such that the MPU 31 will perform, for example, the background data update process disclosed in the above-mentioned Patent Document 2 as a process of updating background data used for the obstruction detection process, instead of performing the background data update process disclosed in the above-mentioned Patent Document 3.

Figure 14A:
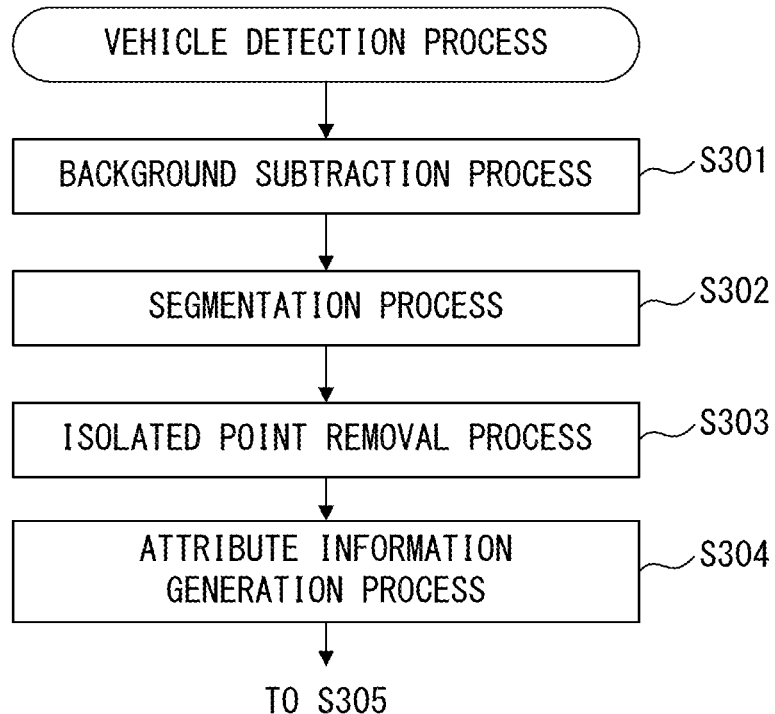
FIG. 14A is a flowchart illustrating how a vehicle detection process is performed.
Figure 14B:
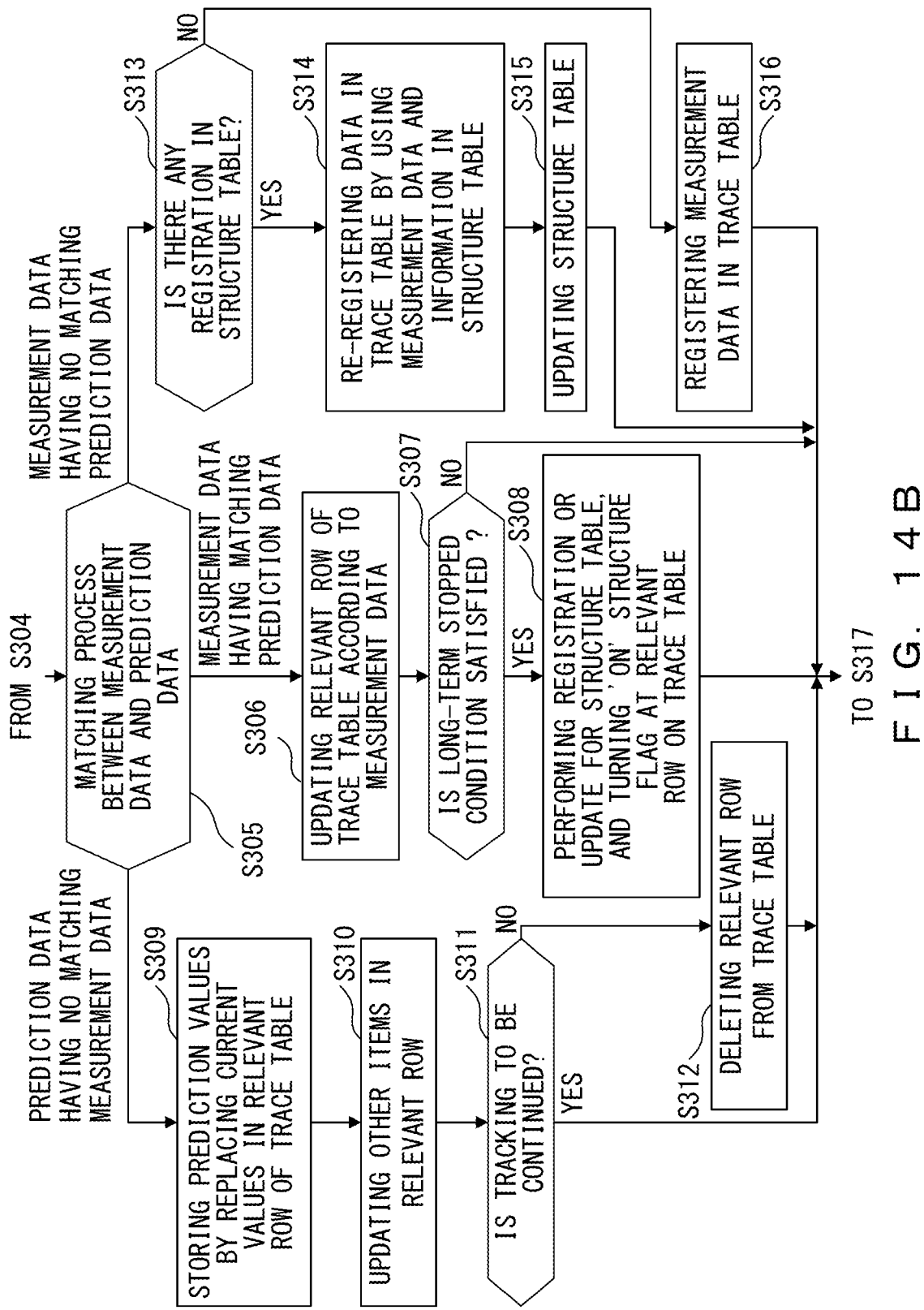
FIG. 14B is a flowchart illustrating how a vehicle detection process is performed.
Figure 14C:
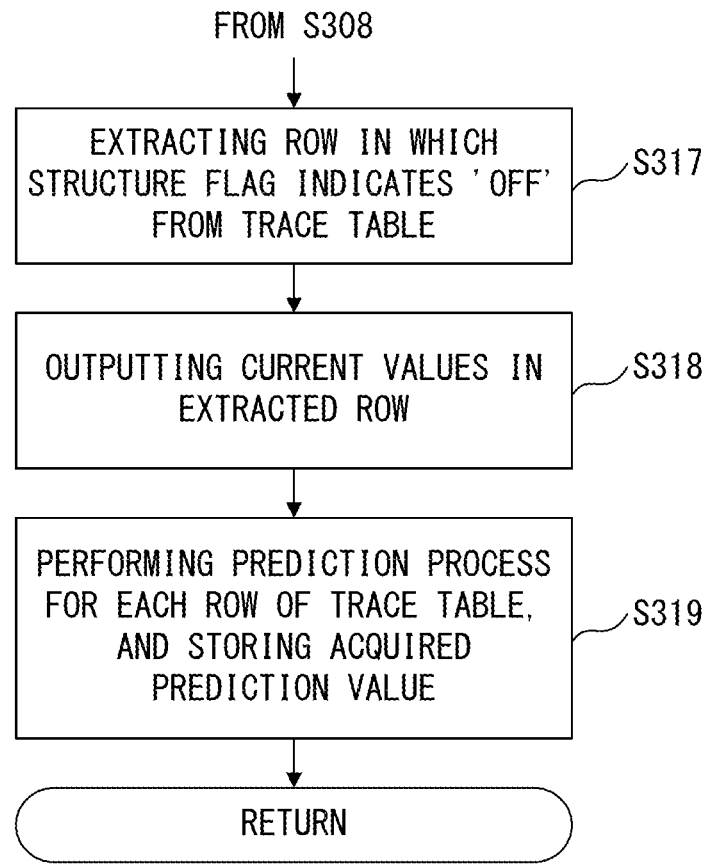
FIG. 14C is a flowchart illustrating how a vehicle detection process is performed.

Next, the vehicle detection process in S107 of the monitoring process of FIG. 7 will be described with reference to FIGS. 14A to 14C. FIGS. 14A to 14C are flowcharts illustrating how the vehicle detection process is performed.

The vehicle detection process enables the MPU 31 to perform the movement object tracking method disclosed in the Description of Japanese Patent Application No. 2012-040638, which was filed by the Applicant of the present application prior to the filing of the present application.

Once the vehicle detection process starts, firstly, in S301 of FIG. 14A, the background subtraction process is performed. In the background subtraction process, the difference between the measurement data and the second background information stored in the RAM 33 that serves as the background information storage unit 11 is calculated so as to delete the measurement data related to an object that recently stopped moving in the detection area of the radar device 1. How the background subtraction process is performed is similar to that of the background subtraction process of S202, and thus the detailed description of the obstruction detection process of FIG. 9 is omitted. However, in the process of S301, the second background information, which is the data of an object that temporarily stops moving in the detection area, which is different from the first background information, which is only the data of a fixed structure that has remained at rest for a long time used in the process of S202, is used to calculate the difference from the measurement data.

Next, the MPU 31 performs the segmentation process in S302, the isolated point removal process in S303, and the attribute generation process in S304. How these processes are performed is similar to that of the processes of S203, S204, and S205 in the obstruction detection process of FIG. 9, and thus the detailed description is omitted. With these processes, it becomes possible to obtain the position and velocity information of objects in the detection range as the attribute information of the objects existing in the detection area of the radar device 1. In the present embodiment, positions on two-dimensional XY-rectangular coordinates are obtained as the positional information of objects in the detection range, by converting values of the angle and distance of the barycenter of the objects.

In the description of FIGS. 14B and 14C below, the position and velocity information of objects obtained as above within the detection range of the radar device 1 is referred to as the measurement data of objects.

When the process moves to FIG. 14B, the MPU 31 performs a matching process for between the measurement data left after the background subtraction process and the prediction data in S305.

Here, the prediction data and matching process will be described with reference to FIG. 15.

FIG. 15 depicts the structure of a trace table.

A trace table 61 is a table in which the measurement data of objects acquired in the processes up to S304 of FIG. 14A, i.e., the detection information, is stored. The measurement data of each object is stored in each row of the trace table 61. The trace table 61 is arranged at a storage region that is specified in advance in the RAM 33, which serves as the detection information storage unit 22.

Hereinafter, items in each row of the trace table 61 will be described.

In the columns "current position" and "current velocity", the position data and moving velocity data in the measurement data of an object to be detected, which are acquired from the most recent output from the radar device 1, are stored as the detection information of the object, respectively. When there is no measurement data of an object to be detected in the measurement data acquired from the most recent output from the radar device 1, prediction values for the measurement data of an object to be detected are stored in the columns "current position" and "current velocity", respectively, as will be described in detail later.

In the columns "position of first appearance" and "velocity of first appearance", the position data and moving velocity data in the measurement data of an object to be detected, which is acquired from a first output of the radar device 1, are stored, respectively.

In the column "number of times of actual measurement", the number of times in which the radar device 1 actually succeeded in detecting an object to be detected, i.e., the number of times in which the detection information of an object to be detected is received, is stored.

In the column "total value of velocity", the total value of the moving velocity data in the measurement data of an object to be detected is stored.

In the column "average velocity", the average moving velocity of an object to be detected, i.e., the resultant value of a calculation in which the value "total value of velocity" is divided by the value "number of times of actual measurement", is stored.

In the column "number of continuous measurement failures", the number of times in which the measurement data of an object to be detected is not continuously included in the measurement data acquired from the output of the radar device 1, i.e., the number of times where the measurement by the radar device 1 has continuously failed, is stored.

In the columns "prediction position" and "prediction velocity", prediction values for the distance data and moving velocity data in the measurement data of an object to be detected that will be obtained from the next output of the radar device 1, which are predicted according to the values of "current position" and "current velocity", are stored, respectively.

In the column "number of times of tracking", the number of times of continuous tracking where an object to be detected is continuously being tracked is stored. In the vehicle tracking process, even for the period during which the radar device 1 keeps failing to detect an object to be detected, the tracking of the object according to prediction values for the monitoring result continues for awhile. The details will be described later. In the column of "number of times of tracking", the number of times of the continuous tracking as above is stored.

In the column "structure flag", a flag that indicates whether an object to be detected is a fixed object or a movement object is stored. The initial value of the structure flag is set to 'OFF' so as to indicate that an object to be detected is a movement object, i.e., a vehicle, and when the later-described specified condition is met afterward, the structure flag is set to 'ON' so as to indicate that an object to be detected is a fixed object. The details will be described later.

The trace table 61 stores the above items of data for each object to be detected. Hereinafter, a pair of data sets consisting of the "prediction position" and the "prediction velocity" of an object to be detected will be referred to as 'prediction data'.

In the matching process in S305 of FIG. 14B, the above measurement data and the above prediction data are compared with each other to determine whether or not they match. Note that in the determination, a permissible range having a specified latitude around the values of the prediction data, including "prediction position" and "prediction velocity", is set, and it is determined that the measurement data and the prediction data match when the measurement data indicates a value within the permissible range.

In the matching process of S305, further, the measurement data is classified into measurement data in which matching prediction data exists and measurement data in which no matching prediction data exists according to a result of the above determination process. Further, prediction data that did not match any measurement data is extracted from the prediction data.

In the measurement data for which the matching process has been performed as above, the processes in S306 to S308 as will be described later are performed for the measurement data in which matching prediction data exists. For the measurement data in which no matching prediction data exists, the processes in S313 to S316 as will be described later are performed. For the prediction data that did not match any measurement data, the processes in S309 to S312 as will be described later are performed. These processes will be described below.

Firstly, the processes in S306 to S308 will be described.

In S306, the MPU 31 refers to a row in the trace table 61 where the prediction data that has been determined to match the measurement data in the matching process is stored, and updates the items in the row according to the measurement data. In particular, the position data and moving velocity data included in the measurement data are stored in the "current position" and "current velocity" of the row, respectively. A value obtained by adding '1' to the value stored in the "number of times of actual measurement" at the time of the present process is stored in the "number of times of actual measurement". A value obtained by adding the moving velocity data included in the measurement data to the value stored in the "total value of velocity" at the time of the present process is stored in the "total value of velocity". A value obtained by dividing the updated value of the "total value of velocity" by the updated value of the "number of times of actual measurement" is stored in the "average velocity". The value '0' is stored in the "number of continuous measurement failures" so as to be initialized, and a value obtained by adding '1' to the value stored in the "number of times of tracking" at the time of the present process is stored in the "number of times of tracking".

The functions of the tracking unit 24 in FIG. 1 are provided by the MPU 31 that performs the matching process of S305 and the subsequently performed process of S306 described above.

Next, in S307, the MPU 31 determines whether or not an object to be detected whose various kinds of data are stored in the row of the trace table 61 being referred to by the process in S306 satisfies a long-term stopped condition, which is used to determine whether an object is a fixed object or a movement object.

The long-term stopped condition includes the first condition where a value of the "velocity of first appearance" for the object should be less than a specified threshold, i.e., in particular, zero velocity or a value close to zero. It is possible to assume that such an object is static since the object was detected by the radar device 1, and thus it becomes possible to determine that the object is a fixed object rather than a movement object, i.e., a vehicle.

In the present embodiment, the long-term stopped condition further includes the second condition. The second condition requires the value of the "number of times of actual measurement" for the object to be equal to or greater than a specified threshold. By imposing the second condition, an effect caused by noise that may temporarily be included in the detection information acquired by the radar device 1 is prevented, and thus the reliability for the existence of the object as a fixed object improves.

In the present embodiment, the long-term stopped condition further includes the third condition. The third condition requires the value of the "number of times of tracking" for the object to be equal to or greater than a specified threshold. Also, by imposing the third condition, an effect caused by noise that may temporarily be included in the detection information acquired by the radar device 1 is prevented, and thus the reliability for the existence of the object as a fixed object improves.

One or both of the second condition and the third condition may be excluded from the long-term stopped condition.

When the determination result is "Yes" in the determination process of S307, i.e., when it is determined that the data of an object to be detected stored in the trace table 61 matches the long-term stopped condition, the MPU 31 shifts the process to S308. On the other hand, when the determination result is "No" in the determination process of S307, i.e., when it is determined that the data of the object to be detected does not match the long-term stopped condition, the MPU 31 shifts the process to S317.

The functions of the determination unit 25 in FIG. 1 are provided by the MPU 31 that performs the process of S307 described above.

In S308, the MPU 31 performs registration or updating for a structure table, and applies the value 'ON' to a "structure flag" in the row of the trace table 61 in which the data of an object to be detected is stored. Then, the process shifts to S317.

Here, the structure table will be described. FIG. 16 depicts the structure of a structure table.

The structure table 62 is a table in which various kinds of information about an object that has been determined to be a fixed object, i.e., a fixed structure, by the monitoring device 10 is stored, and the table is arranged in a storage region that is specified in advance in the RAM 33. The data of the detection information of each object as a fixed object is stored in each row of the structure table 62.

Hereinafter, the items in each row of the structure table 62 will be described.

In the column "ID", identification codes to be given to each individual structure are stored.

In the column "position", the position data of a target structure is stored.

In the column "number of times of actual measurement", the number of times where the radar device 1 actually succeeded in detecting a target structure is stored.

In the column "number of times of tracking", the number of times of continuous tracking where a target structure is continuously being tracked by the monitoring device 10 is stored.

In the column "tracking flag", a flag indicating the current state of the tracking of a target structure is stored. In particular, a '0' of the flag indicates that the tracking of a target structure is successfully being performed according to the output of the radar device 1. Moreover, a '1' of the flag indicates that the tracking of a target structure has been terminated. Further, a '2' of the flag indicates that the tracking of a target structure is not successfully being performed according to the output of the radar device 1, but that tracking is being performed according to prediction values for the measurement data.

In the process of S308 in FIG. 14B, the MPU 31 firstly acquires the value of "current position" in a row of the trace table 61 which is being referred to by the process in S306, and searches the data of "position" in the structure table 62 for a value that matches the value of "current position". Note that in this searching process, a permissible range having a specified latitude around the position of the data of "position" in the structure table 62 is set, and it is determined that the "position" and "current position" match when the "current position" indicates a value within the permissible range.

When data of "position" that matches the value of "current position" is found by the searching process, the MPU 31 updates the data in the row of the structure table 62 in which the data of "position" is included. In particular, the MPU 31 stores the values of the "number of times of actual measurement" and the "number of times of tracking" that are in the row of the trace table 61 that is being referred to by the process of S105 in the "number of times of actual measurement" and the "number of times of tracking" that are in the row of the structure table 62 in which the data of "position" was included. Further, the MPU 31 changes the value of "tracking flag" in the above row to '0'. At this stage, the value of "position" in the above row of the structure table 62 may be replaced with the value of "current position" in the above row of the trace table 61, or both of these values may be replaced with an average value. When an average value of the values is calculated, a weighted average may be calculated.

On the other hand, when the data of "position" that matches the value of "current position" is not found by the searching process, the MPU 31 registers a new row in the structure table 62. In particular, the MPU 31 stores a value that is different from the values in the other rows of the structure table 62 as "ID", and stores the value of "current position" in the above row of the trace table 61 which is being referred to by the process in S306 as "position". The MPU 31 further stores the values of the "number of times of actual measurement" and the "number of times of tracking" in the relevant row of the trace table 61 as "number of times of actual measurement" and "number of times of tracking", and changes the value of "tracking flag" in the above row to '0'.

Next, the processes in S309 through S312 will be described.

As described above, the processes in S309 through S312 are performed for prediction data that did not match any measurement data. This case indicates that an object targeted by the prediction data was not detected at that time by the radar device 1 due to, for example, the aforementioned occlusion caused by other objects, and thus that tracking according to the measured data was not performed.

In the monitoring device 10 according to the present embodiment, even if the measurement of an object to be detected by the radar device 1 is interrupted due to such an occlusion or the like, the tracking of the object according to a prediction value of the detection result will continue for a while. Moreover, in the monitoring device 10 according to the present embodiment, prediction data is output instead of the measured data while the measurement of the object to be detected by the radar device 1 is being terminated. The processes in S309 through S312 are designed to enable the monitoring device 10 to achieve the above functions.

In S309, the MPU 31 refers to the row in the trace table 61 in which the prediction data that did not match any measurement data was stored, and stores the values of the prediction data in the "current position" and "current velocity" of the row. In particular, the values of the prediction data indicate the values of the "prediction position" and "prediction velocity". By performing the process in S309, in the output process of S317 as will be described later, it becomes possible to output prediction data instead of the measured data for an object as a movement object, i.e., a vehicle which was not trackable according to the measured data.

Next, in S310, the MPU 31 updates the other items in the rows of the trace table 61 which are being referred to by the process in S309. In particular, the value stored in the "number of continuous measurement failures" at the time when the present process is being performed and to which '1' is added is stored in the "number of continuous measurement failures" of the row. In the "number of times of tracking", the value stored in the "number of times of tracking" at the time when the present process is being performed and to which '1' is added is stored. If the "structure flag" in the row that is being referred to by the trace table 61 indicates 'ON' at that time, the MPU 31 also sets to a value '2' the "tracking flag" in the row of the structure table 62 corresponding to the fixed object whose data is expressed in the row that is being referred to by the trace table 61.

Next, in S311, the MPU 31 determines whether or not the tracking of an object that is being targeted in the row of the trace table 61 which is being referred to by the process of S309 should be continued. In particular, the MPU 31 reads the value of the "number of continuous measurement failures" in the row, and determines whether or not the value is less than a specified tracking termination determination threshold. Note that the tracking termination determination threshold is a value of, for example, a few to ten times. When the determination result is "Yes", i.e., when it is determined that the "number of continuous measurement failures" is less than a threshold, the MPU 31 determines to continue the tracking of the object and shifts the process to S317. On the other hand, when the determination result is "No", i.e., when it is determined that the "number of continuous measurement failures" has become greater than a threshold, the MPU 31 determines to terminate the tracking of the object and shifts the process to S312.

In S312, the MPU 31 deletes a row that is being referred to by the process of S309 from the trace table 61, and terminates the tracking of the object targeted in the row. Then, the MPU 31 shifts the process to S317. If the "structure flag" in the row that has been deleted from the trace table 61 indicates 'ON' at that time, the MPU 31 also sets to a value '1' the "tracking flag" in the row of the structure table 62 corresponding to the fixed object whose data is expressed in the row that has been deleted from the trace table 61.

Next, the processes in S313 through S316 will be described.

As described above, the processes in S313 through S316 are performed for measurement data that did not match any prediction data. In these processes, the measurement data is newly registered in the trace table 61, and the tracking of the object targeted in the measurement data starts. Note that the object targeted in the measurement data may be an object whose tracking was being performed in the past but that has been terminated as the detection by the radar device 1 was continuously absent for a long time. In particular, when the object is a fixed object, the information of the object may have been already registered in the structure table 62 due to the tracking performed in the past. For this reason, in the processes in S313 through S316, an overlapped registration of the same fixed object in the structure table 62 in the above case is prevented from happening.

Firstly, in S313, the MPU 31 determines whether or not the information of the object targeted in the measurement data that did not match any prediction data is registered in the structure table 62. In particular, in the process of S313, the MPU 31 searches the data of "position" in the structure table 62 for data that matches the position data in the measurement data that did not match any prediction data. Note that in this searching process, a permissible range having a specified latitude around the value of the data of "position" in the structure table 62 is set, and it is determined that the "position" and "current position" match when the value of the position in the measurement data indicates a value within the permissible range.

When the determination result is "Yes" in the determination process of S313, i.e., when it is determined that the information of the object targeted in the measurement data is registered in the structure table 62, the MPU 31 shifts the process to S314. On the other hand, when the determination result is "No" in the determination process of S313, i.e., when it is determined that the information of the object targeted in the measurement data is not registered in the structure table 62, the MPU 31 shifts the process to S316.

In S314, the MPU 31 uses the measurement data that did not match any prediction data and the information found in the process of S313 which is in the structure table 62 related to the object targeted in the measurement data, and re-registers the data of the object in the trace table 61. In particular, the data of "position" of the targeted object in the structure table 62 is stored in the "current position" and "position of first appearance" in the trace table 61. As the object is a fixed object, a value '0' is stored in the "current velocity", "velocity of first appearance", "total value of velocity", and "average velocity" of the trace table 61. In the "number of times of actual measurement" and "number of times of tracking" in the trace table 61, the values stored in the "number of times of actual measurement" and "number of times of tracking" of the targeted object in the structure table 62 at the time when the present process is being performed and to which '1' is added are stored, respectively. Moreover, a value '0' is stored in the "number of continuous measurement failures" for initialization, and a value 'ON' indicating a fixed object is stored in the "structure flag".

Next, in S315, the MPU 31 updates the information of the structure table 62 which is found in the process of S313 and is related to an object targeted in the measurement data, and then shifts the process to S317. In the process of S315, in particular, the values stored in the "number of times of actual measurement" and "number of times of tracking" at the time when the present process is being performed and to which '1' are added are stored, in the "number of times of actual measurement" and "number of times of tracking" in the row relevant to the object in the structure table 62, respectively. Further, a value '0' is set to the "tracking flag" in the row.

In S316, the MPU 31 uses the measurement data that did not match any prediction data, and newly registers the data of the object targeted in the measurement data into the trace table 61. Then, the process shifts to S317. In the process of S316, in particular, the position data in the measurement data is stored in the "current position" and "position of first appearance" in the trace table 61. In the "current velocity", "velocity of first appearance", "total value of velocity", and "average velocity", the moving velocity data in the measurement data is stored. In the "number of times of actual measurement" and "number of times of tracking" of the trace table 61, a value '1' is stored. Moreover, a value '0' is stored in the "number of continuous measurement failures" for initialization, and a value 'OFF' indicating a movement object is stored in the "structure flag".

After the processes of S306 through S316 are performed for the data for which the matching process of S305 is performed as above, the processes of S317 through S319 in FIG. 14C are performed, as will be described below.

Firstly, in S317, the MPU 31 refers to the trace table 61, and extracts a row in which the "structure flag" indicates 'OFF', i.e., a row in which the data of a vehicle as a movement object is stored.

Next, in S318, the MPU 31 reads the "current position" and "current velocity" in the row extracted by the process of S317, and associates the read pieces of data with each other for each row. Then, the MPU 31 instructs the interface device 37 to output the associated data to the higher level device 41.

Next, in S319, the MPU 31 predicts the next detection information about an object to be detected for each row of all the rows in the trace table 61, and stores the prediction result. In the prediction process according to the present embodiment, the MPU 31 firstly acquires the values of "current position" and "average velocity" in a row to be predicted. Next, the MPU 31 multiplies the acquired value of "average velocity" by the time interval at which the process of acquiring measurement data in S101 of FIG. 7 is performed, and predicts the amount of movement of the object to be detected in the time interval. Then, a prediction value for the position of the object is obtained by adding the prediction result for the amount of movement to the acquired value of "current position". Note that the acquired value of "average velocity" is used as a prediction value for the moving velocity of the object. Then, the MPU 31 stores the acquired prediction values for the position and moving velocity in the "prediction position" and "prediction velocity" of the row to be predicted, respectively. The functions of the prediction unit 23 in FIG. 1 are provided by the MPU 31 that performs the above process.

The MPU 31 ends the vehicle detection process illustrated in FIGS. 14A and 14B when the process of S319 described above is completed, and then returns the process to the monitoring process of FIG. 7.

The vehicle detection process is achieved by the processes described above. Due to the vehicle detection process performed by the MPU 31, it becomes possible to continue the tracking of a vehicle even if the vehicle temporarily stops.

Note that the MPU 31 may perform, for example, the obstruction detection method that is disclosed in the aforementioned Patent Document 1 as a vehicle detection process, instead of the obstruction detection method described in the above-mentioned Patent Document 3.

Next, a process of updating background data used for the vehicle detection process in S108 of the monitoring process of FIG. 7 will be described.

The update process is performed subsequent to the vehicle detection process of S107 every time the vehicle detection process of S107 is performed, which is different from the update process for the obstruction detection process described above. The update process for the vehicle detection process is similar to the update process for the obstruction detection process in determining the range in which data update is to be performed within the detection area of the radar device 1 and updating the background data within the update range. In the update process for the vehicle detection process, the measurement data of the vehicle detected by the vehicle detection process of S107 is firstly excluded from the measurement data acquired in the process of S101, and the background data is updated by using the remaining measurement data. By so doing, the second background information, i.e., the data of an object that temporarily stops in the detection area of the radar device 1, is acquired in the update process for the vehicle detection process.

Figure 17:
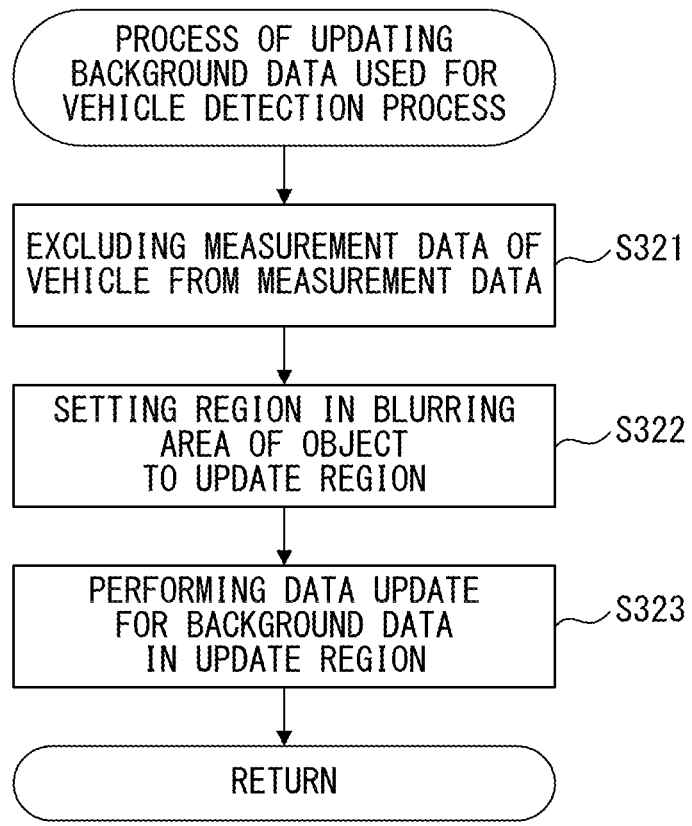
FIG. 17 is a flowchart illustrating how a process of updating background data used for a vehicle detection process is performed.

FIG. 17 will be described. FIG. 17 is a flowchart illustrating how a process of updating background data used for the vehicle detection process is performed.

When the process of FIG. 17 starts, in S321, the MPU firstly excludes the measurement data of the vehicle detected by the vehicle detection process of S107 from the measurement data that was acquired in the most recently performed process of S101.

Next, in S322, the MPU 31 sets a region in the blurring area of the object expressed by the measurement data left after the exclusion process of S321 as an update region in the background data. The process of S322 is similar to the process of S221 in the process of updating background data used for the obstruction detection process in FIG. 13, excluding the point that the measurement data to be processed is different.

Next, in S323, the MPU 31 performs data updating for the background data in the update region set in the above process, and then terminates the process of FIG. 17. The process of S323 is similar to the process of S223 in the process of updating background data used for the obstruction detection process in FIG. 17, and the background data is updated by using Equation (1) above. In the background subtraction process of S301 in FIG. 14A, the second background information updated as above is binarized to obtain the data indicating the existence of an object that has remained at rest in the detection area of the radar device 1, and the difference between the obtained data and the measurement data is calculated.

The process of updating background data used for the vehicle detection process is achieved by the processes described above.

In the processes of FIG. 17, the process of S222 in FIG. 13, i.e., the process of setting as an update region in the background data a region in the blurring area of the object that may be hidden due to occlusion, is not performed. This is because sufficiently precise background data may be obtained without performing the process of S222.

As described above, the process of updating background data used for the vehicle detection process is performed subsequent to the vehicle detection process of S107 every time the vehicle detection process of S107 is performed. Accordingly, even if an object is temporarily hidden due to occlusion, the occlusion is resolved in the subsequently performed update process. For this reason, the process of S222 may also be performed in the process of updating background data used for the vehicle detection process as performed in the process of updating background data used for the obstruction detection process.

As the MPU 31 performs various kinds of processes described above, the computer 30 is enabled to serve as the monitoring device 10, thereby monitoring the shoulder lane 7b of the road 3.

In the monitoring process of FIG. 7, an obstruction detection process as in the processes of S102 to S105 and a vehicle detection process as in the processes in S106 through S108 are sequentially performed. Alternatively, the processes in S102 through S105 and the processes in S106 through S108 may be simultaneously performed in parallel.

The processes of S101, S107, and S108 in the monitoring process of FIG. 7 are repeatedly performed for the regular lanes 7a of the road 3 in FIG. 4. These processes may be repeatedly performed in parallel, with the monitoring process of FIG. 7 performed for the shoulder lane 7b. Alternatively, it may be configured such that the processes of S101, S107, and S108 for the regular lanes 7a is performed subsequent to the process of S108 for the shoulder lane 7b, and then the process is returned to S101 and the monitoring process for the shoulder lane 7b is repeated.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

The invention claimed is:

1. A monitoring device comprising:
   a memory which stores first and second background information related to positional information of a fixed object existing in a detection area of a radar device that receives a reflected wave from an object existing at an emission destination of an emitted radar wave and detects position and moving velocity information of the object as detection information of the object;
   an interface device which manages data transfer with the radar device and higher level device that are connected to the monitoring device, wherein the higher level device instructs the monitoring device to change an operation mode of a monitoring process, and acquires and manages results of monitoring output from the monitoring device; and
   a processor which performs processes including:
      a first detecting process which detects, upon receiving a first specified signal sent from the higher level device to the processor through the interface device, a temporary fixed object that includes an obstruction existing in a detection area of the radar device by using the detection information and the first background information stored in the memory, and which outputs detection result to the higher level device through the interface device; and
      a second detecting process which detects, upon receiving a second specified signal sent from the higher level device to the processor through the interface device, a movement object existing in the detection area of the radar device by using the detection information and the second background information stored in the memory, and which outputs detection result to the higher level device through the interface device.

2. The monitoring device according to claim 1, wherein: the processes further include:
   an update process which updates the second background information stored in the memory according to the detection result of the second detection process.

3. The monitoring device according to claim 2, wherein the second detection process includes:
   an extract process which extracts detection information about an object whose positional information does not match the second background information from the detection information detected by the radar device,
   a store process which stores for each object, the detection information,
   a predict process which predicts, for each object, detection information that is newly detected by the radar device and then is extracted, according to a history of the detection information stored in the memory,
   a track process which tracks an object by specifying an object from which detection information is newly detected by the radar device, according to a result of prediction of the detection information, and
   a determine process which determines whether or not the object being tracked by is a movement object according to a history of detection information about the object stored in the memory, and
   the processor regards positional information of an object that is determined to not be a movement object among objects of which the detection information is detected, as the second background information.

4. The monitoring device according to claim 3, wherein when a moving velocity is less than a specified velocity threshold when the processor detects an object for a first time in the history of the detection information stored in the memory, the processor determines that the object targeted in the history is not a movement object.

5. The monitoring device according to claim 1, wherein the detection area of the radar device includes a plurality of road lanes,
   both detection of the temporary fixed object and detection of the movement object are performed for an area of at least a portion of a lane among the plurality of lanes, and
   both the first background information and the second background information of the area of at least a portion of a lane are stored in the memory.

6. A monitoring method comprising:
   acquiring, by using a processor, detection information output from a radar device connected to the processor through an interface device, wherein the radar device receives a reflected wave from an object existing at an emission destination of an emitted radar wave and detects position and moving velocity information of the object as detection information of the object;
   detecting, by using the processor, upon receiving a first specified signal sent from a higher level device to the processor through the interface device, a temporary fixed object that includes an obstruction existing in a detection area of the radar device by using the detection information detected by the radar device and first background information, the first background information being positional information of a fixed object existing in a detection area of the radar device;
   detecting, by using the processor, upon receiving a second specified signal sent from the higher level device to the processor through the interface device, a movement object existing in the detection area of the radar device by using the detection information detected by the radar device and second background information, the second background information being positional information of a fixed object existing in a detection area of the radar device and being different from the first background information; and
   outputting, by using the processor, a detection result to the higher level device through the interface device.

7. A non-transitory computer-readable recording medium having stored therein a program for causing a computer to execute a process comprising:
   acquiring detection information output from a radar device connected to an interface device of the computer, wherein the radar device receives a reflected wave from an object existing at an emission destination of an emitted radar wave and detects position and moving velocity information of the object as detection information of the object;
   detecting, upon receiving a first specified signal sent from a higher level device to the computer through the interface device, a temporary fixed object that includes an obstruction existing in a detection area of the radar device by using the detection information detected by the radar device and first background information stored in a storage unit, the first background information being positional information of a fixed object existing in a detection area of the radar device;

detecting, upon receiving a second specified signal sent from the higher level device to the computer through the interface device, a movement object existing in the detection area of the radar device by using the detection information detected by the radar device and second background information stored in the storage unit, the second background information being positional information of a fixed object existing in a detection area of the radar device and being different from the first background information; and outputting a detection result to the higher level device through the interface device.

\* \* \* \* \*